United States Patent
Maeda et al.

(10) Patent No.: US 8,963,990 B2
(45) Date of Patent: Feb. 24, 2015

(54) TRANSMISSION MANAGEMENT SYSTEM, TRANSMISSION TERMINAL, TRANSMISSION SYSTEM, METHOD OF MANAGING DATA TRANSMISSION, AND RECORDING MEDIUM STORING DATA TRANSMISSION MANAGEMENT PROGRAM

(71) Applicants: Kaoru Maeda, Kanagawa (JP); Takahiro Asai, Kanagawa (JP); Naoki Umehara, Kanagawa (JP)

(72) Inventors: Kaoru Maeda, Kanagawa (JP); Takahiro Asai, Kanagawa (JP); Naoki Umehara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 102 days.

(21) Appl. No.: 13/903,131

(22) Filed: May 28, 2013

(65) Prior Publication Data
US 2013/0335511 A1 Dec. 19, 2013

(30) Foreign Application Priority Data
Jun. 18, 2012 (JP) ................. 2012-136797

(51) Int. Cl.
*H04N 7/15* (2006.01)
*H04L 29/06* (2006.01)
(Continued)

(52) U.S. Cl.
CPC .............. *H04N 7/15* (2013.01); *H04L 65/403* (2013.01); *H04M 3/567* (2013.01); *H04L 67/325* (2013.01); *H04L 12/1818* (2013.01); *H04L 65/1069* (2013.01); *H04M 2203/555* (2013.01)
USPC ................... 348/14.08; 348/14.09; 348/14.12

(58) Field of Classification Search
CPC ......... H04N 7/15; H04N 7/152; H04N 7/155; H04L 65/403; H04L 65/1069; H04L 67/325; H04L 12/1818; H04M 3/567; H04M 2203/555
USPC ........... 348/14.01–14.16; 370/260–261, 254, 370/390, 400, 410; 709/204
See application file for complete search history.

(56) References Cited

U.S. PATENT DOCUMENTS 6,438,110 B1 8/2002 Rai et al.
2003/0093700 A1* 5/2003 Yoshimoto et al. ........... 713/202
(Continued)

FOREIGN PATENT DOCUMENTS

JP 2002-314965 10/2002
JP 2005-109922 4/2005
(Continued)

OTHER PUBLICATIONS

U.S. Appl. No. 13/777,389, filed Feb. 26, 2013.
(Continued)

*Primary Examiner* — Melur Ramakrishnaiah
(74) *Attorney, Agent, or Firm* — Oblon, Spivak, McClelland, Maier & Neustadt, L.L.P.

(57) ABSTRACT

An apparatus, system, and method of managing data transmission are provided, each of which is capable of generating reservation information regarding communication reserved for at least one of a first transmission terminal and a second transmission terminal, in response to a communication start request that requests to start communication between the first transmission terminal and the second transmission terminal. The reservation information is generated, for example, based on first time information indicating the time at which communication reserved for the first transmission terminal is scheduled to start, and second time information indicating the time at which communication reserved for the second transmission terminal is scheduled to start. The reservation information is transmitted to the first transmission terminal. The data transmission management method may be implemented in the form of a program stored in a non-transitory recording medium.

19 Claims, 21 Drawing Sheets

(51) Int. Cl.
*H04M 3/56* (2006.01)
*H04L 29/08* (2006.01)
*H04L 12/18* (2006.01)

(56) References Cited

U.S. PATENT DOCUMENTS

| | | |
|---|---|---|
| 2006/0173975 A1* | 8/2006 | Nose et al. .................... 709/219 |
| 2007/0133438 A1 | 6/2007 | Shaffer et al. |
| 2011/0219060 A1 | 9/2011 | Ohwada |
| 2011/0279857 A1 | 11/2011 | Hirahara |
| 2012/0314019 A1 | 12/2012 | Asai |
| 2013/0117373 A1 | 5/2013 | Umehara |

FOREIGN PATENT DOCUMENTS

| | | |
|---|---|---|
| JP | 2011-164488 | 8/2011 |
| JP | 2011-199845 | 10/2011 |
| JP | 2011-205612 | 10/2011 |
| JP | 2012-050063 | 3/2012 |
| JP | 2012-147416 | 8/2012 |
| JP | 2012-195926 | 10/2012 |

OTHER PUBLICATIONS

U.S. Appl. No. 13/866,317, filed Apr. 19, 2013.
U.S. Appl. No. 13/903,449, filed May 28, 2013.
Extended European Search Report issued Jul. 17, 2014 in Patent Application No. 13172196.1.

* cited by examiner

FIG. 7

RELAY DEVICE
MANAGEMENT TABLE

| RELAY DEVICE ID | IP ADDRESS |
|---|---|
| 111a | 1.2.1.2 |
| 111b | 1.2.2.2 |
| 111c | 1.3.1.2 |
| 111d | 1.3.2.2 |

FIG. 8

TERMINAL AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG. 9

TERMINAL MANAGEMENT TABLE

| TERMINAL ID | TERMINAL NAME | OPERATION STATE | TERMINAL IP ADDRESS |
|---|---|---|---|
| 01aa | JAPAN TOKYO OFFICE AA TERMINAL | ONLINE | 1.2.1.3 |
| 01ab | JAPAN TOKYO OFFICE AB TERMINAL | COMMUNICATING | 1.2.1.4 |
| ... | ... | ... | ... |
| 01ba | JAPAN OSAKA OFFICE BA TERMINAL | COMMUNICATING | 1.2.2.3 |
| 01bb | JAPAN OSAKA OFFICE BB TERMINAL | ONLINE | 1.2.2.4 |
| ... | ... | ... | ... |
| 01ca | U.S. NY OFFICE CA TERMINAL | OFFLINE | 1.3.1.3 |
| 01cb | U.S. NY OFFICE CB TERMINAL | ONLINE | 1.3.1.4 |
| ... | ... | ... | ... |
| 01da | U.S. WASH, D.C. OFFICE DA TERMINAL | COMMUNICATING | 1.3.2.3 |
| 01db | U.S. WASH, D.C. OFFICE DB TERMINAL | COMMUNICATING | 1.3.2.4 |
| ... | ... | ... | ... |

FIG. 10

SESSION MANAGEMENT TABLE

| SESSION ID | RESERVATION ID | RELAY DEVICE ID | TERMINAL ID |
|---|---|---|---|
| se01 | rsv02 | 111a | 01ab, 01db |
| se02 | rsv06 | 111b | 01bd |
| se03 | rsv08 | 111c | 01ae, 01dc |
| ... | ... | ... | ... |

FIG. 11

RESERVATION MANAGEMENT TABLE

| RESERVATION ID | START DATE/TIME | END DATE/TIME | CONFERENCE NAME | TERMINAL ID |
|---|---|---|---|---|
| rsv01 | 2011/11/10 10:00 | 2011.11.10 11:30 | New York Branch Liaison | 01bb, 01da |
| rsv02 | 2011/11/10 13:30 | 2011.11.10 14:50 | STRATEGY MEETING | 01aa, 01ab, 01db |
| rsv03 | 2011/11/10 15:00 | 2011.11.10 17:00 | SECURITY | 01ca, 01da |
| rsv04 | 2011/11/10 09:00 | 2011.11.10 10:00 | PRODUCT PLANNING | 01ba, 01ca |
| rsv05 | 2011/11/11 12:00 | 2011.11.17 13:00 | PERFORMANCE REPORT | 01aa, 01ba, 01ca |
| ... | ... | ... | ... | ... |

FIG. 13

REGISTER SCHEDULE    JAPAN TOKYO OFFICE AA TERMINAL  LOGOUT

DATE 2011/11/10

TIME 13:30 — 14:50

NAME STRATEGY MEETING

PARTICIPANTS  JAPAN TOKYO OFFICE AA TERMINAL
SELECT        JAPAN TOKYO OFFICE AB TERMINAL
              U.S. WASH, D.C. OFFICE DB TERMINAL

STORE    CANCEL

SELECT TERMINAL
- ☑ JAPAN TOKYO OFFICE AA TERMINAL
- ☑ JAPAN TOKYO OFFICE AB TERMINAL
- ☐ JAPAN OSAKA OFFICE BA TERMINAL
- ☐ JAPAN OSAKA OFFICE BB TERMINAL
- ☐ U.S. NEW YORK OFFICE CA TERMINAL
- ☐ U.S. NEW YORK OFFICE CB TERMINAL
- ☐ U.S. WASH, D.C. OFFICE DA TERMINAL
- ☑ U.S. WASH, D.C. OFFICE DB TERMINAL

OK    CANCEL

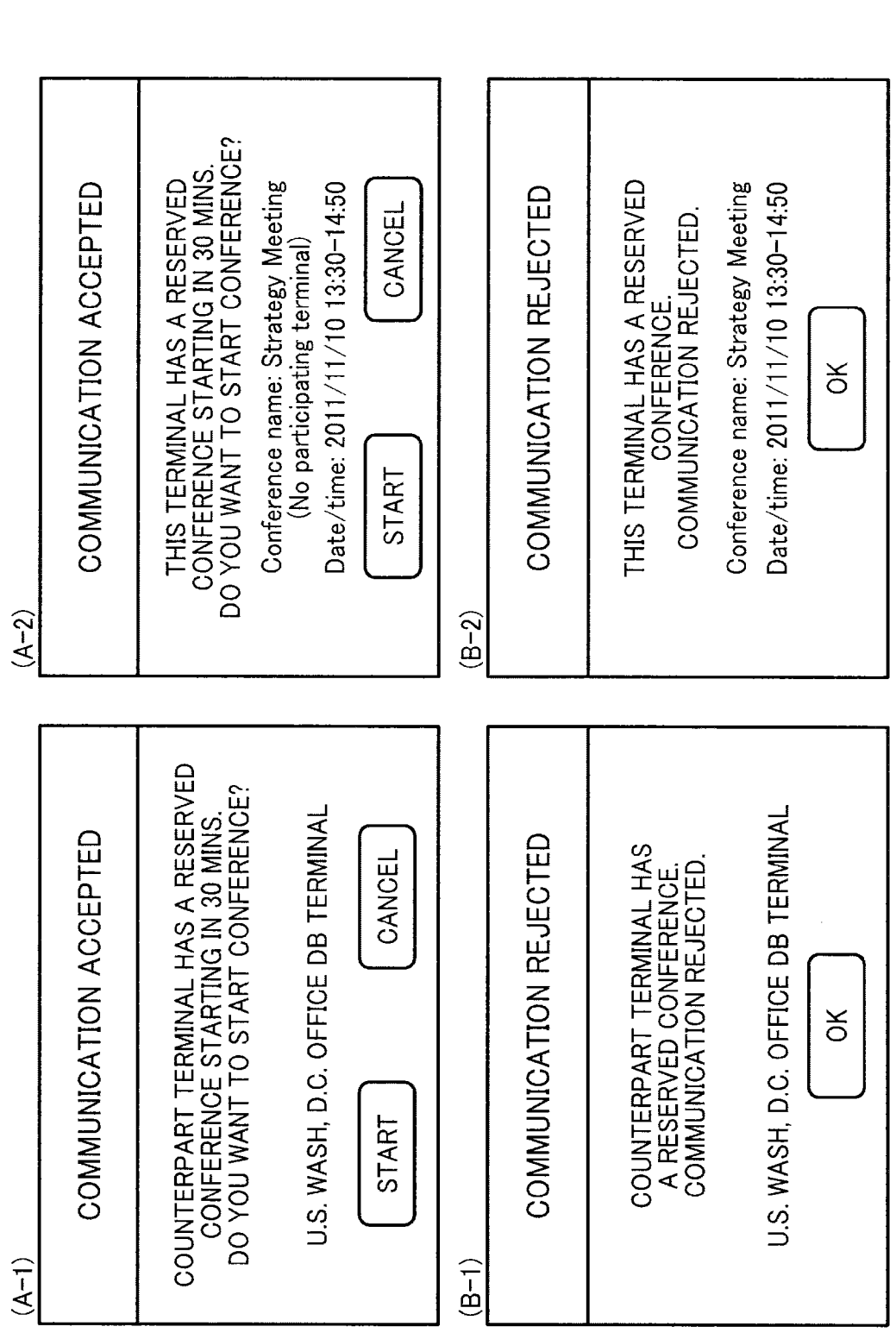

TRANSMISSION MANAGEMENT SYSTEM, TRANSMISSION TERMINAL, TRANSMISSION SYSTEM, METHOD OF MANAGING DATA TRANSMISSION, AND RECORDING MEDIUM STORING DATA TRANSMISSION MANAGEMENT PROGRAM

CROSS-REFERENCE TO RELATED APPLICATIONS

This patent application is based on and claims priority pursuant to 35 U.S.C. §119 to Japanese Patent Application No. 2012-136797, filed on Jun. 18, 2012, in the Japan Patent Office, the entire disclosure of which is hereby incorporated by reference herein.

BACKGROUND

1. Technical Field

The present invention generally relates to an apparatus, system, and method of managing data transmission, each of which is capable of generating reservation information in response to a request for starting communication between or among a plurality of transmission terminals, a non-transitory recording medium storing a data management program, and a transmission terminal that receives the reservation information for output to a user.

2. Description of the Related Art

With the need for reducing costs or times associated with business trips, more companies are moving towards data transmission systems provided with teleconference or videoconference ("conference") capabilities to carry out communication among a plurality of transmission terminals. For example, the videoconference systems allow transmission of contents data such as image data and/or sound data among a plurality of videoconference terminals through a communications network such as the Internet to carry out videoconference.

When communication is managed using a management server, for example, as described in Japanese Patent Application Publication No. 2005-109922-A (Registration No. 4292544), the user cannot freely change the time to start or end, as the management server manages communication based on the scheduled information.

While the management server can allow the user to freely change the time to start or end the conference without requiring the user to change the scheduled information, for example, as described in Japanese Patent Application Publication No. 2011-199845-A, the management system may not be able to manage communication based on the scheduled information, as communication may be started or ended irrespective of the scheduled information.

For example, the management system may start communication between a request transmission terminal and a counterpart transmission terminal in response to a request from the request transmission terminal, not based on the scheduled information. In such case, the counterpart transmission terminal, which starts communication with the request transmission terminal, may not be able to start communication with the other transmission terminal based on the scheduled information.

SUMMARY

In view of the above, according to one aspect of the present invention, an apparatus, system, and method of managing data transmission are provided, each of which is capable of generating reservation information regarding communication reserved for at least one of a first transmission terminal and a second transmission terminal, in response to a communication start request that requests to start communication between the first transmission terminal and the second transmission terminal. The reservation information is generated, for example, based on first time information indicating the time at which communication reserved for the first transmission terminal is scheduled to start, and second time information indicating the time at which communication reserved for the second transmission terminal is scheduled to start. The reservation information is transmitted to the first transmission terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is an example data structure of a relay device management table, managed by the management system of FIG. 6;

FIG. 8 is an example data structure of a terminal authentication management table, managed by the management system of FIG. 6;

FIG. 9 is an example data structure of a terminal management table, managed by the management system of FIG. 6;

FIG. 10 is an example data structure of a session management table, managed by the management system of FIG. 6;

FIG. 11 is an example data structure of a reservation management table, managed by the management system of FIG. 6;

FIG. 13 is an illustration of a reservation registration screen, displayed at the terminal of FIG. 3;

FIGS. 16A and 16B are illustration of example screens having messages, generated by the management system of FIG. 6, according to an example embodiment of the present invention;

Figure 1:
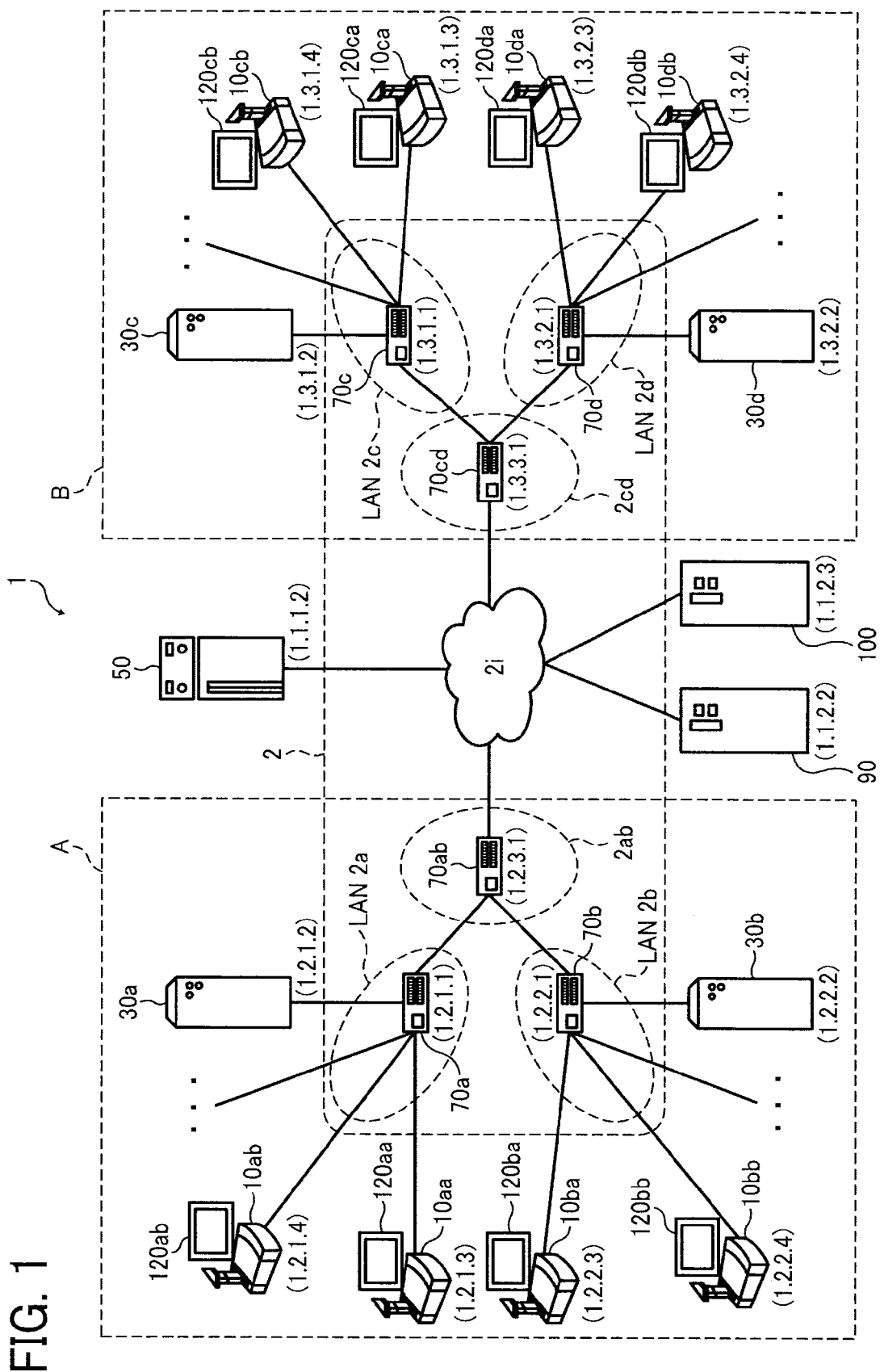
FIG. 1 is a schematic block diagram illustrating a configuration of a transmission system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2:
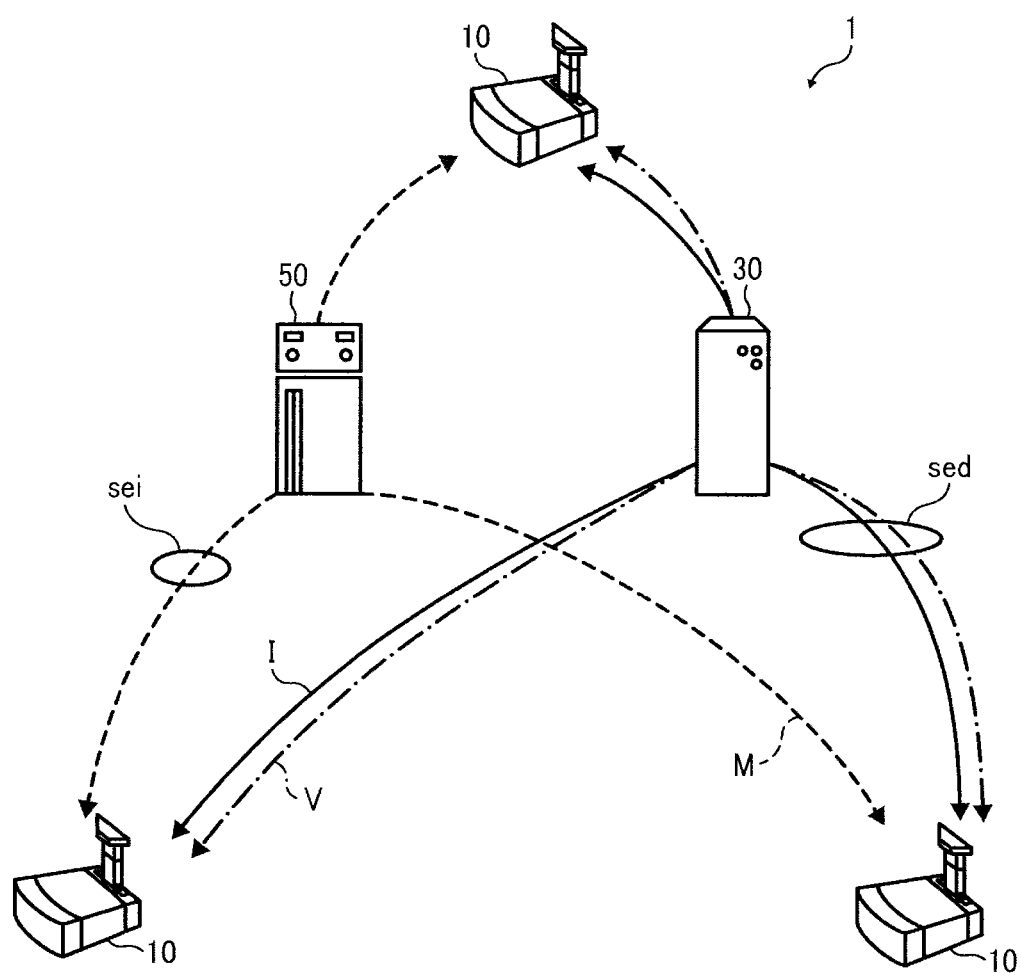
FIG. 2 is an illustration for explaining transmission or reception of data such as image data, sound data, or management data, performed by the transmission system of FIG. 1.

FIG. 1 is a schematic block diagram illustrating a transmission system, according to an example embodiment of the present invention. FIG. 2 is an illustration for explaining transmission or reception of data such as image data, sound data, or management data, performed by the transmission system of FIG. 1.

In one example, the transmission system 1 functions as a data providing system that transmits contents data from one transmission terminal to another transmission terminal in one direction through a transmission management system 50. In another example, the transmission system 1 functions as a two-way communication system that exchanges various information including image data and/or sound data between or among two or more of a plurality of transmission terminals 10 each of which functions as a communication terminal, through the transmission management system 50 that functions as a communication management system. When functioning as the communication system, the transmission system 1 may be implemented as a videoconference system, video teleconference system, voice conference system, voice teleconference system, or personal computer screen sharing system.

In the following examples, it is assumed that the transmission system 1 of FIG. 1 is implemented as the videoconference system, which is one example structure of the communication system. Based on this assumption, the transmission management system 50 is implemented as the videoconference communication management system, which is one example structure of the communication management system. Further, the transmission terminal 10 is implemented as the videoconference communication terminal, which is one example structure of the communication terminal. However, the use of transmission system 1 is not limited to the following examples such that the transmission system 1 may be implemented as the transmission system or the communication system as described above.

The transmission system 1 of FIG. 1 includes a plurality of transmission terminals 10aa, 10ab, 10ba, 10bb, 10ca, 10cb, 10da, and 10db, and a plurality of displays 120aa, 120ab, 120ba, 120bb, 120ca, 120cb, 120da, and 120db, a plurality of relay devices 30a, 30b, 30c, and 30d, a transmission management system 50, a program providing system 90, and a maintenance system 100.

The transmission terminal 10 transmits or receives contents data such as image data and/or sound data to or from another transmission terminal 10. In this example, it is assumed that a moving image is transmitted as the image data. Alternatively, a still image, or both of the still image and the moving image, may be transmitted as the image data.

For the descriptive purposes, in this example, any number of the plurality of terminals 10aa to 10db may be collectively or each referred to as the terminal 10. Any number of the plurality of displays 120aa to 120db may be collectively or each referred to as the display 120. Any number of the plurality of relay devices 30a, 30b, 30c, and 30d may be collectively or each referred to as the relay device 30. The transmission management system 50 may be referred to as the "management system" 50.

The terminal 10 that transmits data to another terminal 10 to carry out videoconference may be referred to as the request terminal 10. The terminal 10 that receives data from another terminal 10 to carry out videoconference may be referred to as the counterpart terminal 10. For example, the request terminal 10 includes any terminal 10 that requests another terminal 10 to start videoconference, and the counterpart terminal 10 includes any terminal 10 that is associated with the request terminal 10 to start videoconference.

As illustrated in FIG. 2, in the transmission system 1, the terminals 10 each establish a management data session "sei" with the management system 50 to start transmission and reception of various types of management data "M" with the management system 50. Further, in this example, the terminals 10 each establish contents data sessions "sed" with the relay device 30 to transmit or receive contents data with the relay device 30. The contents data sessions include at least one session "I" to transmit image data, and a session "V" to transmit sound data such as voice data. In this example, the contents data session may be referred to as the image and/or sound data session.

Referring back to FIG. 1, the terminal 10 transmits or receives contents data such as image data and sound data to or from a counterpart terminal 10 to establish communication with the counterpart terminal 10. As described below, the terminal 10 transmits or receives image data in addition to sound data. Alternatively, the terminal 10 may transmit or receive only sound data. The relay device 30 relays contents data such as image data or sound data between or among the terminals 10. For example, the relay device 30 may be implemented by a router or any device that provides the function of router. The management system 50 centrally manages various information regarding the terminal 10 or the relay device 30.

The plurality of routers 70a to 70d, 70ab, and 70cd, which may be collectively or each referred to as the router 70, selects a route that is most suitable for transmitting contents data such as image data and sound data.

The program providing system 90 includes a hard disk device (HD) 204 (FIG. 5), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay device 30 to perform various functions or operations. For example, the program providing system 90 sends the relay control program to the relay device 30 through the Internet 2i to cause the relay device 30 to install the relay control program. Further, the HD 204 of the program providing system 90 may store a transmission management program that causes the management system 50 to perform various functions or operations. For example, the program providing system 90 sends the transmission management program to the management system 50 to cause the management system 50 to install the transmission management program.

The maintenance system 100 is implemented as one or more computers capable of maintaining, managing, fixing, or upgrading at least one of the terminal 10, relay device 30, management system 50, and program providing system 90. Assuming that the maintenance system 100 is provided within a country, and the terminal 10, relay device 30, management system 50, and program providing system 90 are each installed outside the country, the maintenance system 100 maintains, manages, fixes, or upgrades at least one of the terminal 10, relay device 30, management system 50, and program providing system 90, remotely through the communications network 2. The maintenance system 100 may manage maintenance of at least one of the terminal 10, relay device 30, management system 50, and program providing system 90 without using the communications network 2. For example, a machine type number, a manufacturing number, customer information, maintenance and repair information, and failure log information may be maintained at the maintenance system 100 without using the communications network 2.

Still referring to FIG. 1, the terminals 10aa and 10ab, the relay device 30a, and the router 70a are connected to a local area network (LAN) 2a. The terminals 10ba and 10bb, the relay device 30b, and the router 70b are connected to a LAN 2b. The LAN 2a and the LAN 2b are connected to a leased line 2ab in which the router 70ab is provided. It is assumed that these devices including the terminals 10aa to 10bb are located in an area A. For example, assuming that the area is any area in Japan, the LAN 2a could be located within an office in a city such as Tokyo, and the LAN 2b could be located within an office in another city such as Osaka.

The terminals 10ca and 10cb, the relay device 30c, and the router 70c are connected to a LAN 2c. The terminals 10da and 10db, the relay device 30d, and the router 70d are connected to a LAN 2d. The LAN 2c and the LAN 2d are connected to a leased line 2cd in which the router 70cd is provided. It is assumed that these devices including the terminals 10ca to 10db are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70ab and 70cd.

The management system 50 and the program providing system 90 are connected through the Internet 2i to the terminal 10 and the relay device 30. Any one of the management system 50 and the program providing system 90 may be located at any location within or outside any one of the area A and the area B.

In this example, the communications network 2 includes the LAN 2a, LAN 2b, leased line 2ab, Internet 2i, leased line 2cd, LAN 2c, and LAN 2d. Any one or any portion of these lines or any other lines that may be included in the communications network 2 may be implemented as wired network or wireless network such as Wireless Fidelity (WiFi) network or Bluetooth (Registered Trademark) network.

As shown in FIG. 1, the terminal 10, the relay device 30, the management system 50, the router 70, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

<Hardware Structure of Transmission System>

Figure 3:
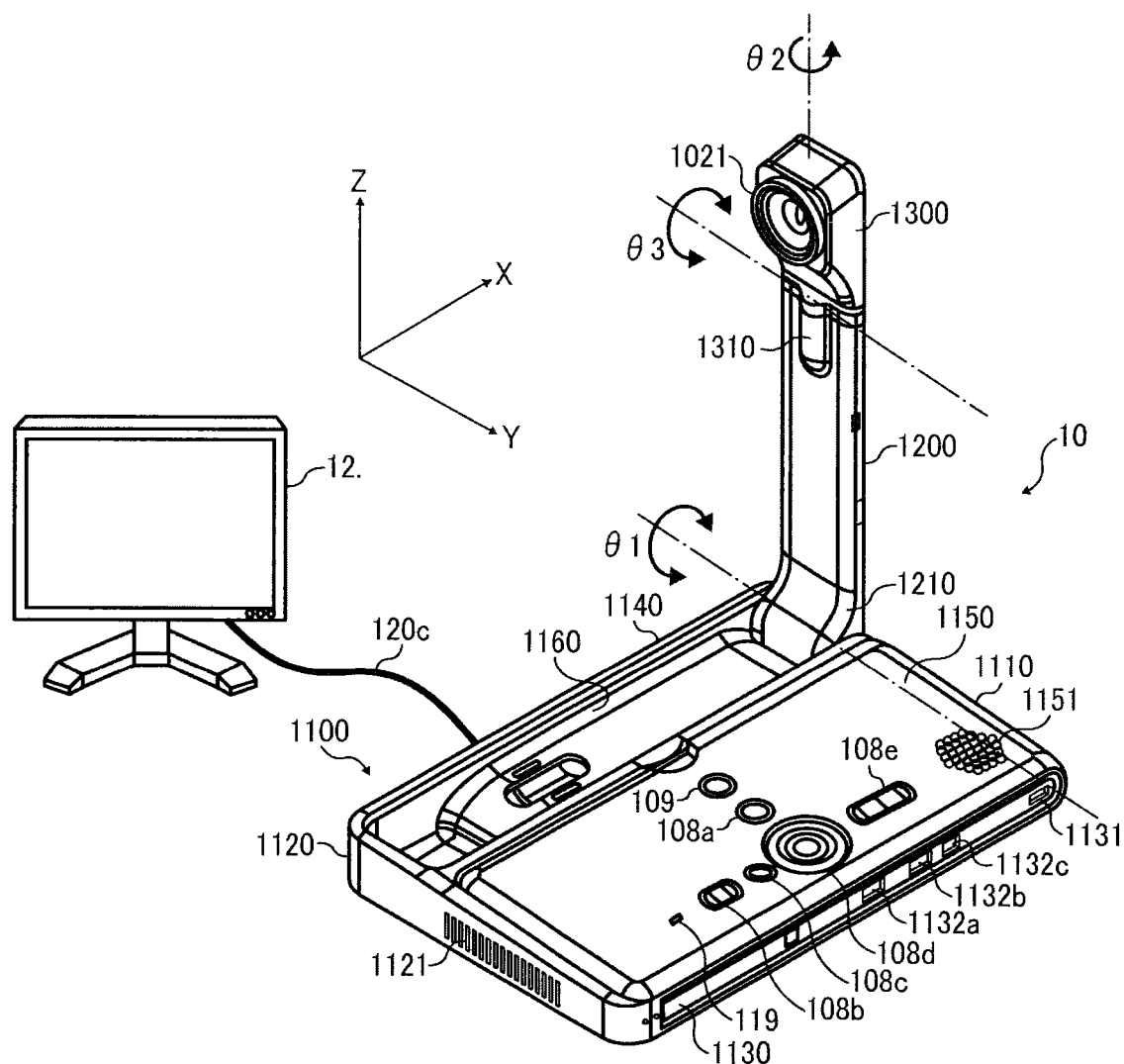
FIG. 3 is a perspective view illustrating the outer appearance of a transmission terminal of the transmission system of FIG. 1.
Figure 4:
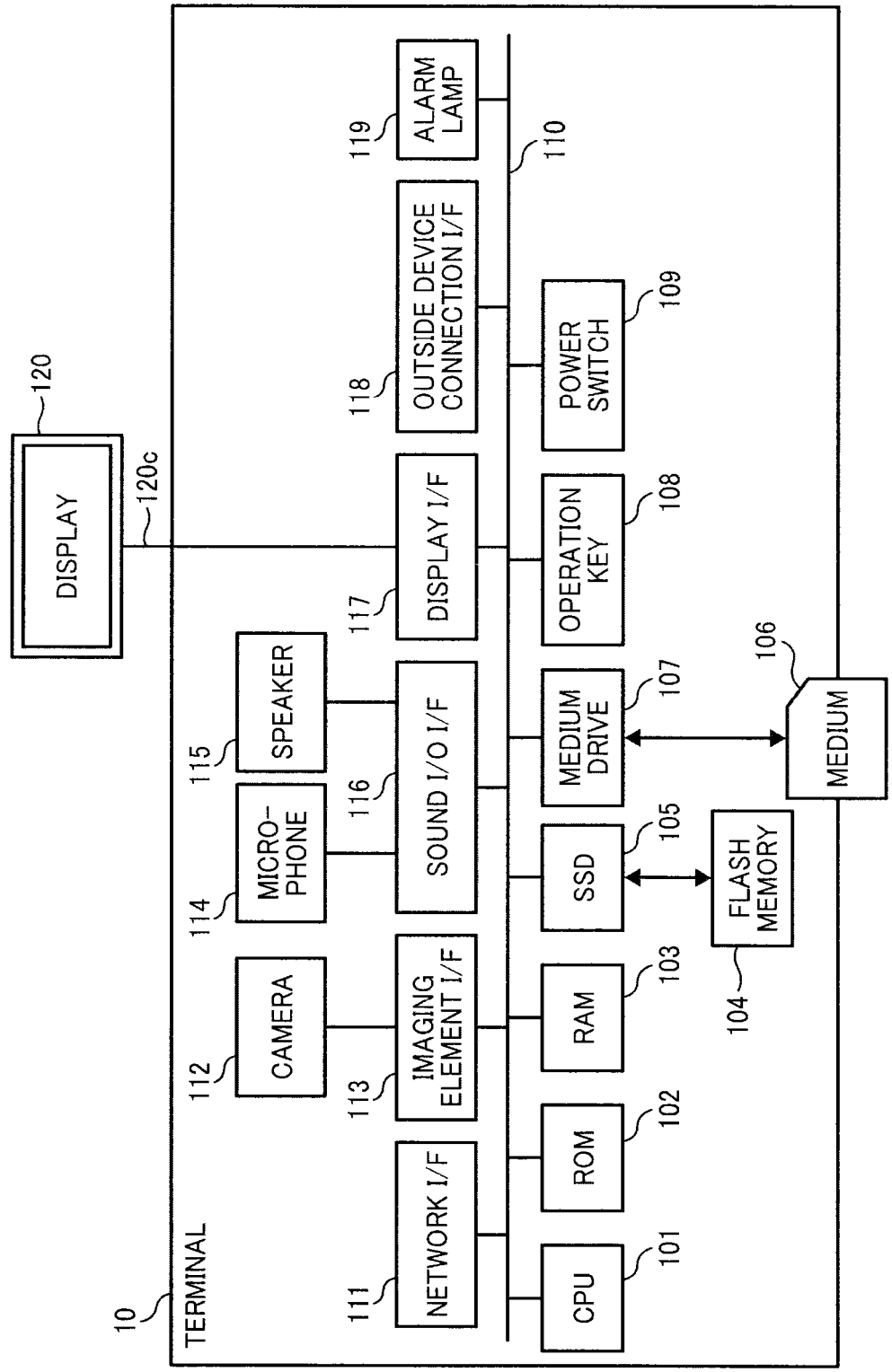
FIG. 4 is a schematic block diagram illustrating a hardware structure of the transmission terminal of FIG. 1.

Referring now to FIGS. 3 and 4, a hardware structure of the terminal 10 is explained according to an example embodiment of the present invention. FIG. 3 is a perspective view illustrating the outer appearance of the terminal 10. FIG. 4 is a schematic block diagram illustrating a hardware structure of the terminal 10. In FIG. 3, the longitudinal direction of the terminal 10 is referred to as X direction. The direction orthogonal to the X direction, which is the horizontal direction of the terminal 10, is referred to as the Y direction. The direction orthogonal to the X direction and the Y direction is referred to as the Z direction.

As illustrated in FIG. 3, the terminal 10 includes a body 1100, an arm 1200, and a camera housing 1300. The body 1100 includes a backside wall 1110 having a plurality of air intake holes that are formed over the nearly entire surface of the intake surface of the backside wall 1110. The body 1100 further includes a front sidewall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 4) of the terminal 10 is able to catch sounds such as human voice or any sound including noise.

The body 1100 has an operation panel 1150, which is provided at a front surface toward the right side wall 1130. The operation panel 1150 includes a plurality of operation keys 108a to 108e ("the operation key 108"), a power switch 109, an alarm lamp 119, and a plurality of sound output holes 1151. Through the sound output holes 1151, a speaker 115 (FIG. 4) of the terminal 10 is able to output sounds such as sounds generated based on human voice. The body 1100 further includes a holder 1160, which is provided at the front surface toward the left sidewall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 4). The body 1100 further includes a left sidewall 1140, which is provided with a connection port to connect the external display 120 to the display I/F 117 through a cable 120c.

The arm 1200 is fixed to the body 1100 via a torque hinge 1210. With the torque hinge 1210, the arm 1200 can be rotated in directions of up and down with respect to the body, while making a tilt angle θ1 of up to 135 degrees. FIG. 3 illustrates the case where the tilt angle θ1 is 90 degrees.

The camera housing 1300 incorporates therein the camera 112 (FIG. 4) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 3, the pan angle θ2 and the tilt angle θ3 are each 0 degree.

The relay device 30, the management system 50, the program providing system 90, and the maintenance system 100 are each implemented by a general-purpose computer such as a personal computer or a server computer. For simplicity, explanation of the outer appearance of the computer is omitted.

Referring to FIG. 4, the terminal 10 includes a central processing unit (CPU) 101, a read only memory (ROM) 102, a random access memory (RAM) 103, a flash memory 104, a solid state drive (SSD) 105, a medium drive 107, the operation key 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation key 108 allows the user to input a user instruction, for example, by allowing the user to select a communication destination such as the counterpart terminal 10. The power switch 109 allows the user to switch on or off the power of the terminal 10. The network I/F 111 allows the terminal 10 to transmit data through the communications network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O OF 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 3 and 4, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 3). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM).

In alternative to the outer appearance of FIG. 3 or the hardware structure of FIG. 4, the terminal 10 may be implemented in various other ways. For example, the terminal 10 may be implemented by a desktop or a notebook computer. The camera or the microphone may be incorporated in the terminal 10 or connected to the terminal 10.

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 5:
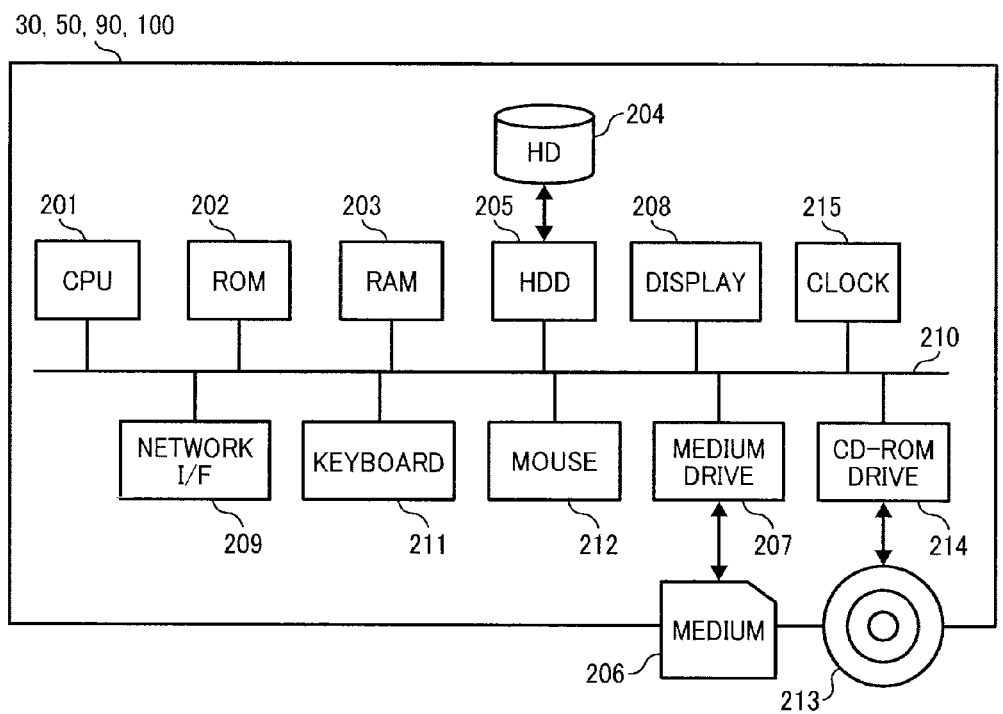
FIG. 5 is a schematic block diagram illustrating a hardware structure of any one of the transmission management system, relay device, program providing system, and maintenance system of the transmission system of FIG. 1.

FIG. 5 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, a CD-ROM drive 214, and a clock 215, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The HID 204 stores therein various data such as the transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communications network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used. The clock 215 may be implemented by an internal clock of the management system 50, which is capable of counting a time period.

The transmission management program may be written onto a recording medium that is readable by a general-purpose computer such as the recording medium 206 or the CD-ROM 213 in any format that is installable or executable by a general-purpose computer. Once the transmission management program is written onto the recording medium, the recording medium may be distributed. Further, the transmission management program may be stored in any desired memory other than the HD 204, such as the ROM 202.

The relay device 30 is substantially similar in hardware structure to the management system 50 of FIG. 5, except for replacement of the management program with a relay device control program that is used for controlling the relay device 30. The relay device control program may be written onto a recording medium that is readable by a general-purpose computer such as the recording medium 206 or the CD-ROM 213 in any format that is installable or executable by the general-purpose computer. Once the relay device control program is written onto the recording medium, the recording medium may be distributed. Further, the relay device control program may be stored in any desired memory other than the HD 204, such as the ROM 202.

The program providing system 90 is substantially similar in hardware structure to the management system 50 of FIG. 5, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management system 50 of FIG. 5, except for replacement of the management program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

Other examples of removable recording medium, which may be used in replace of the CD-ROM 213, include, but not limited to, compact disc recordable (CD-R) disc, digital versatile disc (DVD), and blue ray disc.

<Functional Structure of Transmission System>

Figure 6:
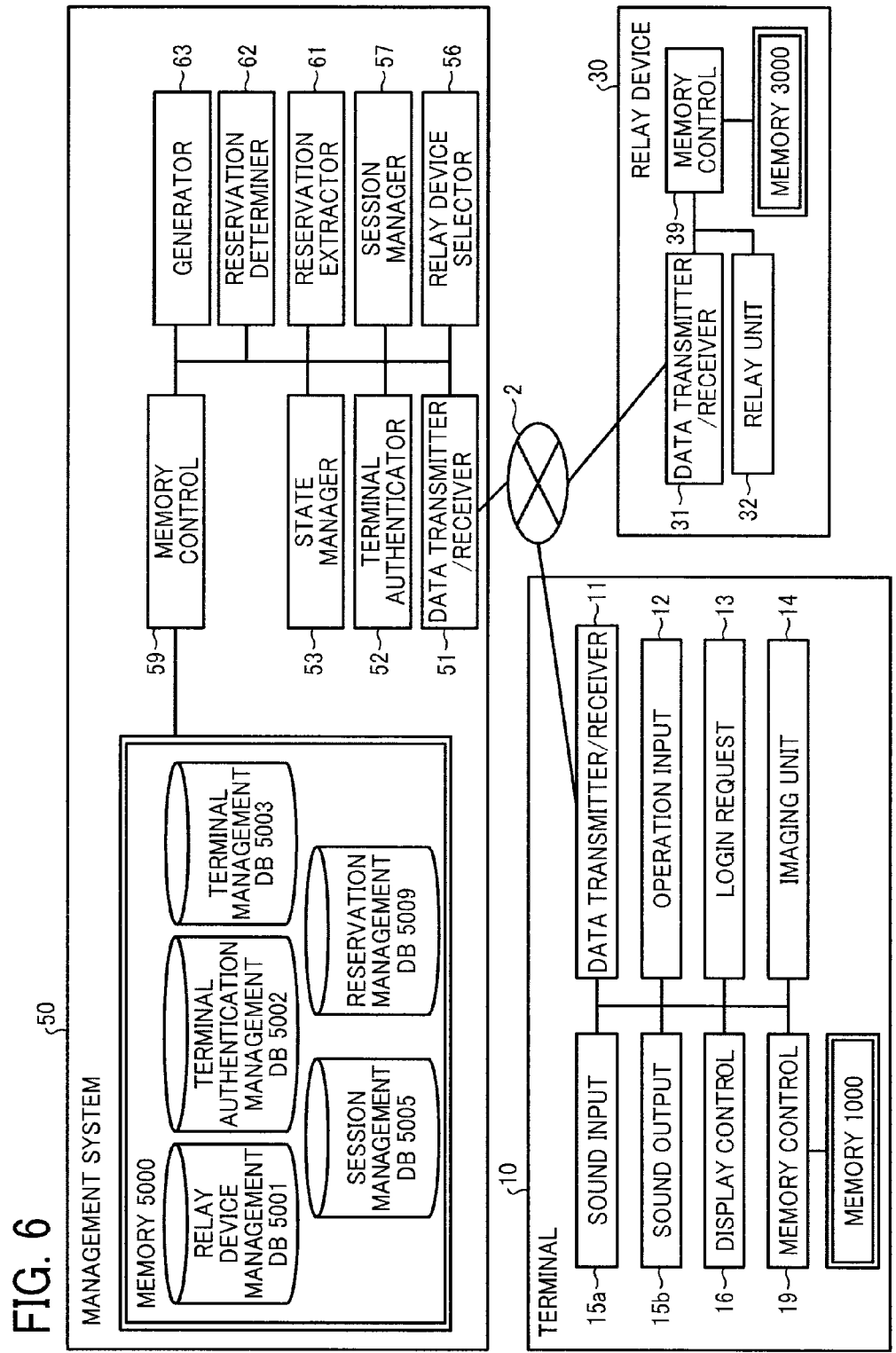
FIG. 6 is a schematic block diagram illustrating a functional structure of the transmission system of FIG. 1.

Next, a functional structure of the transmission system of FIG. 1 is explained according to an example embodiment of the present invention. FIG. 6 is a schematic block diagram illustrating functional structures of the transmission system 1. As illustrated in FIG. 6, the terminal 10, the relay device 30, and the management system 50 exchange data with one another through the communications network 2. In FIG. 6, the program providing system 90 and the maintenance system 100 of FIG. 1 are omitted.

<Functional Structure of Terminal>

The terminal 10 includes a data transmitter/receiver 11, an operation input 12, a login request 13, an imaging unit 14, a sound input 15a, a sound output 15b, a display control 16, and a memory control 19. These units shown in FIG. 6 correspond to a plurality of functions or functional modules, which are executed according to an instruction of the CPU 101 (FIG. 4) that is generated according to the terminal control program being loaded from the flash memory 104 onto the RAM 103. The terminal 10 further includes a memory 1000 that may be implemented by the flash memory 104 and the RAM 103 of FIG. 4.

Referring now to FIGS. 4 and 6, a functional structure of the terminal 10 is explained according to an example embodiment of the present invention. More specifically, in this example, the operations or functions that are performed by the terminal 10, which include the operations or functions performed by the units shown in FIG. 6, are performed in relation to one or more hardware devices of the terminal 10 that are shown in FIG. 4.

The data transmitter/receiver 11, which may be implemented by the network I/F 111 (FIG. 4) under control of the CPU 101, transmits or receives various data or information to or from another terminal, device, or system, through the communications network 2.

The operation input 12 receives a user instruction input by the user through the operation key 108 or the power switch 109 (FIG. 4), under control of the instructions received from the CPU 101. For example, when the user selects "ON" using the power switch 109, the operation input 12 receives a user instruction for turning the power on, and causes the terminal 10 to turn on the power. In another example, the operation input 12 receives a user instruction that selects whether to start communication with a counterpart terminal 10.

The operations or functions of the login request 13 are performed according to an instruction received from the CPU 101 (FIG. 4). When the power of the terminal 10 is turned on, the login request 13 automatically causes the data transmitter/receiver 11 to send login request information that requests the login process, and a current IP address of the terminal 10, to the management system 50 through the communications network 2. When the power of the terminal 10 is turned off according to a user instruction received from the user through the power switch 109, the login request 13 causes the data transmitter/receiver 11 to send current operation state information of the terminal 10 to the management system 50, which indicates that the power of the terminal 10 is turned off. After the operation state information is sent, the operation input 12 turns off the power of the terminal 10. As the operation state information of the terminal 10 is sent every time the power is turned off, the management system 50 is able to know that the terminal 10 is offline in realtime.

The operations or functions of the imaging unit 14 of the terminal 10 are performed by the camera 112 and the imaging element I/F 113 according to an instruction received from the CPU 101 (FIG. 4). The imaging unit 14 takes an image of an object to output image data of the object.

The operations or functions of the sound input 15a of the terminal 10 are performed by the sound I/O I/F 116 according to an instruction received from the CPU 101, in cooperation with the microphone 114. After the microphone 114 converts sounds of the user at the terminal 10 to a sound signal, the sound input 15a inputs the sound signal in the form of sound data for further processing. The operations or functions of the sound output 15b of the terminal 10 are performed by the sound I/O I/F 116 according to an instruction received from the CPU 101, in cooperation with the speaker 115. The sound output 15b outputs a sound signal of sound data that is received from the counterpart terminal 10 through the speaker 115.

The operations or functions of the display control 16 of the terminal 10 are performed by the display I/F 117 according to an instruction received from the CPU 101 (FIG. 4). The display control 16 controls transmit of image data, which is generated based on image data received from the counterpart terminal 10, to the display 120.

The memory control 19 is implemented by the SSD 105 of FIG. 4 according to an instruction received from the CPU 101. The memory control 19 stores various data in the memory 1000, or reads out various data from the memory 1000. The memory 1000 stores therein various data such as terminal identification (ID) information for identifying the terminal 10, and a password for authenticating a user at the terminal 10. The memory 1000 further stores therein image data and/or sound data that is received as the terminal 10 communicates with a counterpart terminal 10 such that the image data and/or sound data are overwritten. Before the image data is overwritten, an image generated based on the image data is displayed onto the display 120. Before the sound data is output, sounds generated based on the sound data is output through the speaker 150.

In this example, any one of the terminal ID of the terminal 10 and the relay device ID of the relay device 30 includes any type of identification information that can be expressed by any language, character, symbol, mark, or any combination of language, character, symbol, and mark.

<Functional Structure of Relay Device>

Now, a functional structure of the relay device 30 is explained. The relay device 30 includes a data transmitter/receiver 31, a relay unit 32, and a memory control 39. These units shown in FIG. 6 correspond to a plurality of functions or functional modules, which are executed according to an instruction of the CPU 201 (FIG. 5) that is generated according to the relay device control program being loaded from the HD 204 onto the RAM 203. The relay device 30 further includes a memory 3000 that may be implemented by the RAM 203 and/or the HD 204 (FIG. 5).

(Functional Structure of Relay Device)

Next, a functional structure of the relay device 30 is explained according to an example embodiment of the present invention. More specifically, in this example, the operations or functions that are performed by the relay device 30, which include the operations or functions performed by the units shown in FIG. 6 are performed in cooperation with one or more hardware devices of the relay device 30 that are shown in FIG. 5.

The data transmitter/receiver 31, which may be implemented by the network I/F 209 (FIG. 5), transmits or receives various data or information to or from another terminal, device, or system, through the communications network 2, under control of instructions received from the CPU 201.

The relay unit 32, which may be implemented by instructions received from the CPU 201 (FIG. 5), relays contents data between or among the terminals 10 through the data transmitter/receiver 31, in the contents data session "sed".

The memory control 39 is implemented by the HDD 205 of FIG. 5 according to an instruction received from the CPU 201. The memory control 39 stores various data in the memory 3000, or reads out various data from the memory 3000.

<Functional Structure of Management System>

The management system 50 includes a data transmitter/receiver 51, a terminal authenticator 52, a state manager 53, a relay device selector 56, a session manager 57, a memory control 59, a reservation extractor 61, a reservation determiner 62, and a generator 63. These units shown in FIG. 6 correspond to a plurality of functions or functional modules, which are executed according to an instruction of the CPU 201 (FIG. 5) that is generated according to the transmission management program being loaded from the HD 204 onto the RAM 203. The management system 50 further includes a memory 5000, which may be implemented by the HD 204 (FIG. 5).

(Relay Device Management Table)

The memory 5000 includes a relay device management database (DB) 5001, which stores therein a relay device management table of FIG. 7. The relay device management table of FIG. 7 stores the IP address of the relay device 30 for each relay device ID of the relay device 30. For example, for the relay device 30a having the relay terminal ID "111a", the relay device management table of FIG. 7 indicates that the IP address of the relay device 30a is "1.2.1.2".

(Terminal Authentication Management Table)

The memory 5000 further includes a terminal authentication management database (DB) 5002, which stores a terminal authentication management table of FIG. 8. The terminal authentication management table of FIG. 8 stores a plurality of terminal IDs respectively assigned to the terminals 10 that are managed by the management system 50, in association with a plurality of passwords that are previously determined for the respective terminals 10. For example, referring to the terminal authentication management table of FIG. 8, the terminal 10aa having the terminal ID "01aa" is assigned with the password "aaaa".

(Terminal Management Table)

The memory 5000 further includes a terminal management database (DB) 5003, which stores a terminal management table of FIG. 9. The terminal management table of FIG. 9 stores, for each one of the terminal IDs assigned to the terminals 10, the terminal name to be used for communication with the terminal 10, the operation state of the terminal 10, and the IP address of the terminal 10. For example, for the terminal 10aa having the terminal ID "01aa", the terminal management table of FIG. 9 indicates that the terminal name is "Japan Tokyo Office AA terminal", the operation state is online ("ONLINE"), and the IP address of the terminal 10aa is "1.2.1.3".

(Session Management Table)

The memory 5000 further includes a session management database (DB) 5005, which stores a session management table of FIG. 10. In this example, the session management DB 5005 functions as one example of a manager that manages a reserved conference participating terminal and a relay device. The session management table of FIG. 10 stores information regarding each of the sessions that are currently carried out by at least two terminals 10 of the transmission system 1. More specifically, for each session ID that uniquely identifies each contents data session "sed" being carried, the session management table of FIG. 10 stores a reservation ID that identifies a reserved conference that corresponds to the contents data session "sed", a relay device ID of the relay device 30 that transmits or receives contents data such as image data and sound data through the contents data session "sed", a terminal ID of each one of the terminals 10 currently participating in the contents data session "sed". For example, referring to the session management table of FIG. 10, the contents data session having the session ID "se03" is a session to carry out a conference that is previously scheduled with the reservation ID "rsv08", using the relay device 30 having the relay device ID "111c" that relays contents data between the terminal 10ae having the terminal ID "01ae" and the terminal 10dc having the terminal ID "01dc". For any contents data session that is not established to carry out a reserved conference, the "reservation ID" field remains blank. Further, in this example, the relay device ID is one example of relay device identification information, and the terminal ID is one example of participating terminal identification information.

(Reservation Management Table)

The memory 5000 further stores a reservation management database (DB) 5009, which stores a reservation management table of FIG. 11. In this example, the reservation management table of FIG. 11 functions as one example of a start time manager or a reservation manager. The reservation management table of FIG. 11 is used to manage various information regarding a conference that is previously scheduled as a reserved conference. The reservation management table of FIG. 11 stores, for each of the reservation IDs that uniquely identifies a reserved conference, the date and time at which the reserved conference is scheduled to start, the date and time at which the reserved conference is scheduled to end, the conference name to be used for identifying the reserved conference, and the terminal ID of each one of the terminals 10 that are registered as the terminals 10 participating in the reserved conference. For example, referring to the reservation management table of FIG. 11, the conference assigned with the reservation ID "rsv03" is scheduled to start at "2011/11/10, 15:00 PM" and end at "2011/11/10, 17:00 PM". The conference has the conference name "Security meeting". The terminal IDs of the participating terminals 10 are "01ca" and "01db". The reservation ID, the start date/time, the end date/time, the conference name, and the terminal ID of the reservation management table may be managed by the management system 50, according to an instruction received through the terminal 10, for example, by adding or deleting the contents in each data field through the memory control 59. Further, in this example, any information regarding the reserved conference, which is stored in the reservation management table, such as the start date/time or the end date/time is one example.

(Functional Structure of Management System)

Next, a functional structure of the management system 50 is explained according to an example embodiment of the present invention. In this example, the operations or functions that are performed by the management system 50, which include the operations or functions performed by the units shown in FIG. 6, are performed in relation to one or more hardware devices of the management system 50 that are shown in FIG. 5.

The data transmitter/receiver 51, which may be implemented by the network I/F 209 (FIG. 5) according to an instruction received from the CPU 201, transmits or receives various data or information to or from another terminal, device, or system through the communications network 2. More specifically, in one example, the data transmitter/receiver 51 functions as a connection controller, which transmits relay device connection information to the terminal 10 to control connection between the terminal 10 and the relay device 30. In another example, the data transmitter/receiver 51 functions as a receiver, which receives communication start request information to accept a request to start communication between or among the terminals 10. In another example, the data transmitter/receiver 51 functions as an output unit, which transmits response information indicating a response with respect to the communication start request, to the terminal 10.

Under control of the CPU 201 (FIG. 5), the terminal authenticator 52 obtains a terminal ID and a password from the login request information that is received from the data transmitter/receiver 51. Using the terminal ID and the password as a search key, the terminal authenticator 52 searches the terminal authentication management DB 5002 (FIG. 8) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 5), manages the operation state of the terminal 10 such as the operation state of the request terminal 10 that sends the login request information, using the terminal management table stored in the terminal management DB 5003 (FIG. 9). The terminal management DB 5003 stores therein the terminal ID of the terminal 10, the operation state of the terminal 10, and the IP address of the terminal 10, in association with one another. For example, when the power of the terminal 10 is switched from the ON state to the OFF state according to a user instruction received through the power switch 109, the state manager 53 receives the operation state information of the terminal 10 indicating that the terminal 10 is turned off, from the terminal 10. Based on the operation state information of the terminal 10, the state manager 53 changes the operation state information of the terminal 10 that is stored in the terminal management DB 5003 from the on-line state to the off-line state.

The relay device selector 56, which operates according to the instructions received from the CPU 201 (FIG. 5), selects one of the relay devices 30 that is used to relay contents data between or among the plurality of terminals 10 through the contents data session "sed".

The session manager 57, which operates according to the instructions received from the CPU 201 (FIG. 5), generates a session ID for identifying the contents data session "sed", as the contents data session "sed" is newly established between or among the terminals 10. The session manager 57 stores the session ID, the reservation ID that uniquely identifies the reserved conference on which the contents data session "sed" is based, and the terminal ID of each one of the terminals 10 participating in that session, in a corresponding manner, in the session management DB 5005 (FIG. 10) of the memory 5000. The session manager 57 further stores, for each session ID, the relay device ID of the relay device 30 that is selected by the relay device selector 56 as a relay device that relays contents data, in the session management DB 5005 (FIG. 10).

The memory control 59 is implemented by the HDD 205 of FIG. 5 according to an instruction received from the CPU 201. The memory control 59 stores various data in the memory 5000, or reads out various data from the memory 5000.

The reservation extractor 61, which operates according to the instructions received from the CPU 201 (FIG. 5), searches the reservation management table stored in the reservation management DB (FIG. 11) using a reservation ID obtained from the request terminal 10, which requests for starting communication with the counterpart terminal 10, to obtain the terminal ID of one or more terminals 10 that are stored in association with the reservation ID of the request terminal 10. The reservation extractor 61 further searches the reservation management table stored in the reservation management DB (FIG. 11) using a reservation ID obtained from the counterpart terminal 10 to obtain the terminal ID of one or more terminals 10 that are stored in association with the reservation ID of the counterpart terminal 10. The reservation extractor 61 may further search the reservation management table (FIG. 11) using the reservation ID as a search key to extract additional information regarding the reserved conference, such as the date/time at which the reserved conference is scheduled to start, the date/time at which the reserved conference is scheduled to end, and a name of the reserved conference. In such case, the reservation extractor 61 functions as a start date/time extractor.

The reservation determiner 62, which operates according to the instructions received from the CPU 201 (FIG. 5), determines whether the reservation ID associated with the request terminal 10, which is extracted by the reservation extractor 61, matches the reservation ID associated with the counterpart terminal 10.

The generator 63, which operates according to the instruction received from the CPU 201 (FIG. 5), generates a message in response to the communication start request received from the terminal 10, based on information regarding the start date/time of the reserved conference that is managed using the reservation management table. The generator 63 may further generate a message indicating whether the reserved conference is being carried out, based on the terminal ID managed using the session management table.

<Operation of Transmission System>

Figure 12:
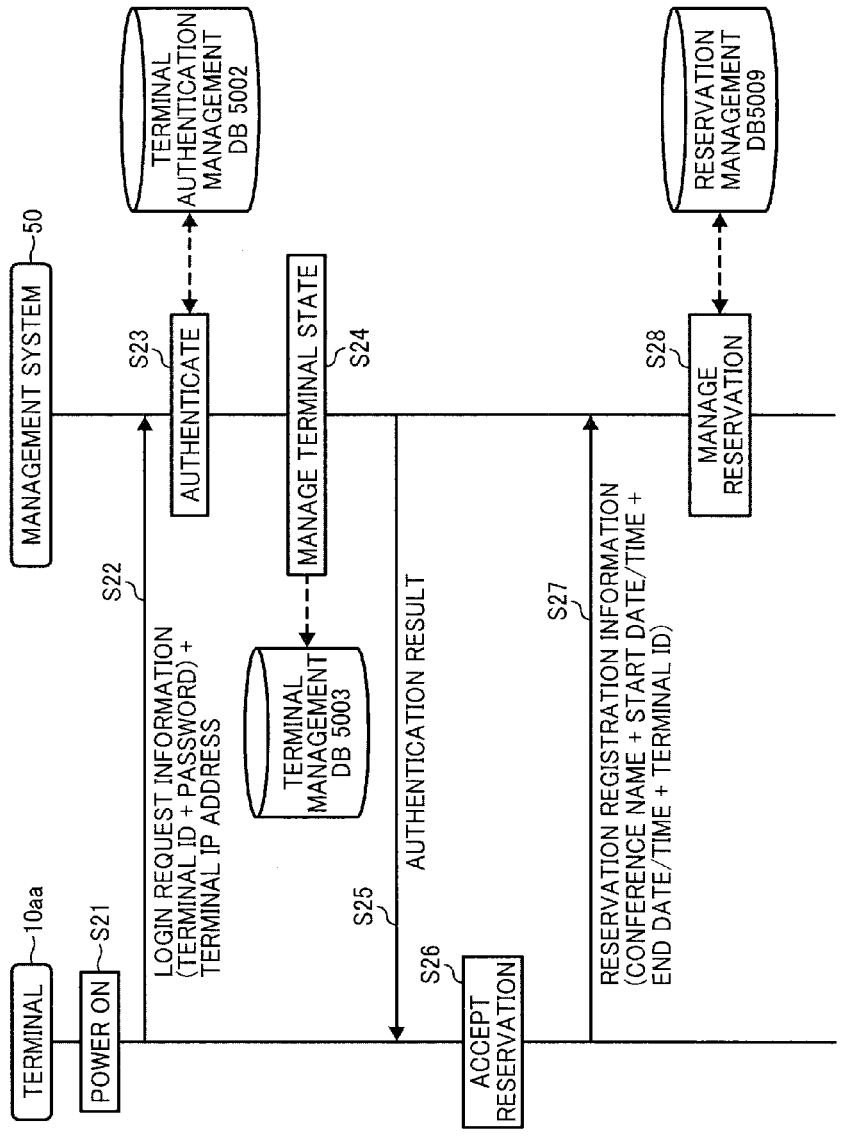
FIG. 12 is a data sequence diagram illustrating operation of establishing communication among two or more terminals of the transmission system of FIG. 1, according to an example embodiment of the present invention.

Referring now to FIGS. 12 and 13, operation of transmitting or receiving various management data in preparation for communication by the terminal 10*aa*, performed by the transmission system of FIG. 1, is explained according to an example embodiment of the present invention. FIG. 12 is a data sequence diagram illustrating operation of registering a conference to be performed between or among the plurality of terminals 10. In FIG. 12, the management data is transmitted or received through the management data session "sei" of FIG. 2. FIG. 15 is an illustration of an example registration screen to be displayed to the user at the request terminal 10*aa*.

Referring to FIG. 12, at S21, the user at the request terminal 10*aa* turns on the power of the request terminal 10*aa* through the power switch 109 (FIG. 4). The operation input 12 of the request terminal 10*aa* (FIG. 6) turns on the power of the request terminal 10*aa*.

At S22, as the power of the request terminal 10*aa* is turned on, the login request 13 of the request terminal 10*aa* automatically causes the data transmitter/receiver 11 to send the login request information that requests the login process to the management system 50 through the communications network 2. The login request information includes a terminal ID that identifies the request terminal 10*aa*, and a password associated with the terminal ID of the request terminal 10*aa*. The terminal ID and the password may be obtained by the memory control 19 from the memory 1000, and sent to the data transmitter/receiver 11. At the time of sending the login request information from the request terminal 10*aa* to the management system 50, the request terminal 10*aa* sends an IP address of the request terminal 10*aa* such that the management system 50 can obtain the IP address of the request terminal 10*aa*.

At S23, the terminal authenticator 52 of the management system 50 searches the terminal authentication management table (FIG. 8) stored in the memory 5000 using the terminal ID and the password of the login request information received through the data transmitter/receiver 51, to determine whether the terminal ID and the password stored in the terminal authentication management table matches the terminal ID and the password of the login request information. When it is determined that the terminal ID and the password of the login request information matches the terminal ID and the password stored in the terminal authentication management DB 5002, the terminal authenticator 52 determines that the terminal 10*aa* is authenticated.

At S24, when the terminal authenticator 52 authenticates that the login request information is received from the authenticated terminal 10, the state manager 53 of the management system 50 stores the operation state and the IP address of the terminal 10*aa*, with respect to the terminal ID and the terminal name of the terminal 10*aa* in the terminal management table (FIG. 9) to create or update a record of the terminal 10*aa*. Using the terminal management table of FIG. 9, which stores the operations state of online and the terminal IP address of "1.2.1.3" in association with the terminal ID "01*aa*" and the terminal name "AA Terminal", various information regarding the terminal 10*aa* can be managed.

At S25, the data transmitter/receiver 51 of the management system 50 sends the authentication result obtained by the terminal authenticator 52 to the request terminal 10*aa* that has sent the login request information through the communications network 2. As described above, in this example, it is assumed that the terminal authenticator 52 determines that the terminal 10*aa* is an authenticated terminal.

At S26, the display control 16 of the terminal 10*aa* displays a registration screen of FIG. 13 on the display 120*aa*. Through the registration screen, the user at the terminal 10*aa* inputs various information regarding a conference to be registered. The operation input 12 receives a user input including, for example, the conference name, the start date/time, the end date/time, and one or more terminals 10 that are scheduled to participate in the conference.

At S27, the data transmitter/receiver 11 of the terminal 10*aa* transmits conference reservation registration information ("reservation registration information") to request for registering a conference, to the management system 50. More specifically, the conference reservation registration information includes various information obtained through the user input, such as the conference name, the start date/time, the end date/time, and the terminal ID of each of the terminals 10 that are scheduled to participate in that conference.

At S28, when the data transmitter/receiver 51 of the management system 50 receives the reservation registration information, the memory control 59 stores the received reservation registration information, such as the conference name, the start date/time, the end date/time, and the terminal IDs of the participating terminals 10, in the registration management table of FIG. 11, in association with a reservation ID that identifies the reserved conference that is registered. In this example, the reservation ID may be generated at the management system 50 or at the terminal 10*aa*, when registering the conference. For example, assuming that the user at the terminal 10*aa* inputs various information as illustrated in FIG. 13, the reservation management table of FIG. 11 stores, for the reservation ID "rsv02", the start date/time "2011/11/10 13:30", the end date/time "2011/11/10 14:50", the conference name "Strategy Meeting", and the terminal IDs "01*aa*" "01*ab*" and "01*db*" that respectively correspond to the terminal 10*aa*, the terminal 10*ab*, and the terminal 10*db*. The operation of registering the conference ends at S28.

Figure 14:
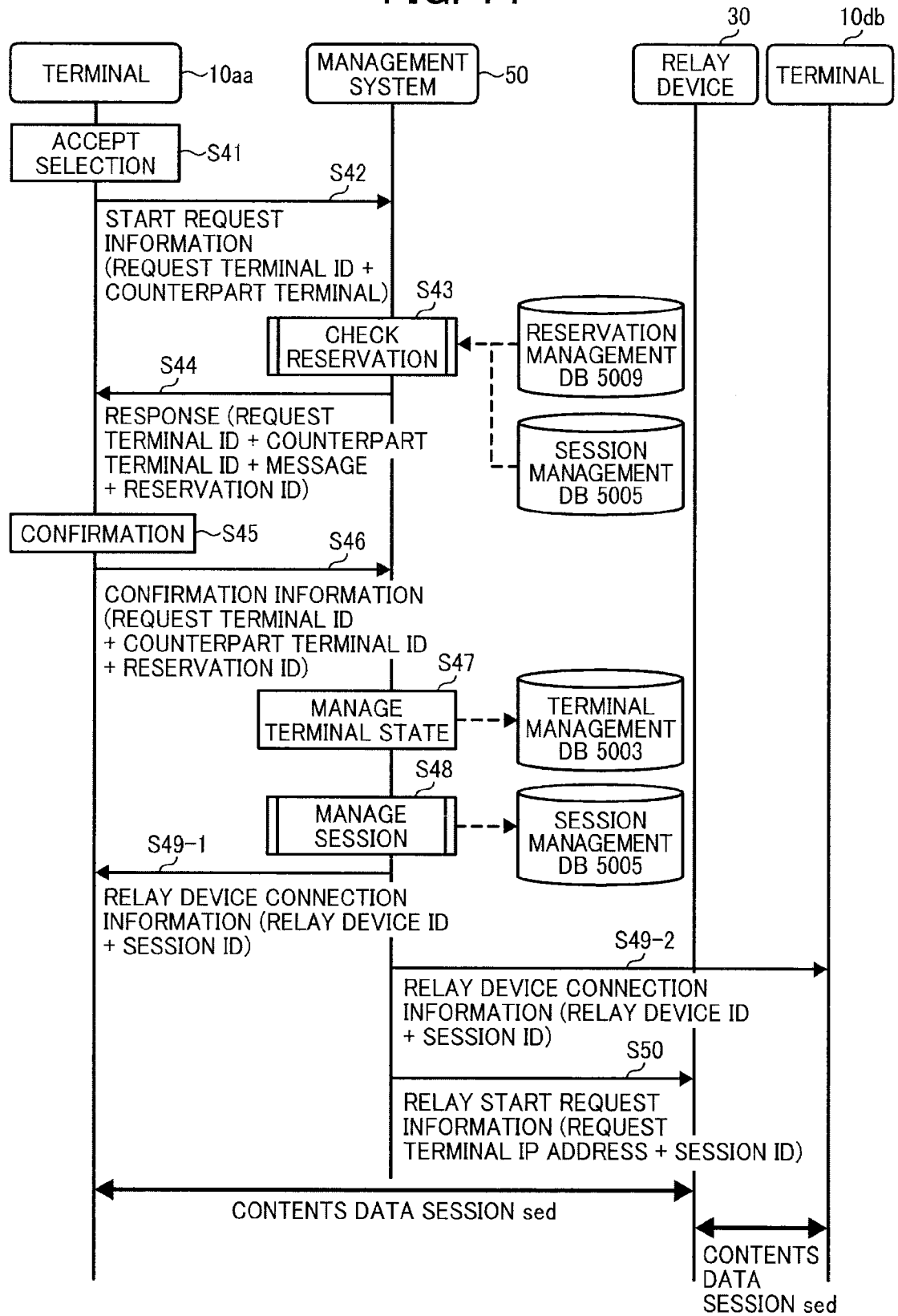
FIG. 14 is a data sequence diagram illustrating operation of processing a request for starting communication with a counterpart terminal, performed by the transmission system of FIG. 1, according to an example embodiment of the present invention.

Referring now to FIG. 14, operation of starting communication based on reservation, in response to a request received from the terminal 10*aa*, performed by the transmission system 1, is explained according to an example embodiment of the present invention. FIG. 14 is a data sequence diagram illustrating operation of starting communication between the terminal 10*aa* and the terminal 10*db*. In FIG. 14, various management data is transmitted or received through a management data session "sei".

In this example, the memory 1000 of the terminal 10*aa* stores a terminal name and a terminal ID for each one of one or more candidate counterpart terminals 10. The display control 16 causes the display 120*aa* to display the terminal name of each one of the candidate counterpart terminals, which are stored in the memory 1000.

As the user at the request terminal 10*aa* uses the operation key 108 of FIG. 3 to select the terminal 10*db* as a counterpart terminal, at S41, the operation input 12 receives a user instruction for starting communication with the counterpart terminal 10*db*.

At S42, the data transmitter/receiver 11 of the terminal 10*aa* transmits start request information, which requests starting of communication, to the management system 50. The start request information includes the terminal ID "01*aa*" of the request terminal 10 that requests for starting communication, and the terminal ID "01*db*" of the counterpart terminal 10*db* that is selected by the request terminal 10*aa*. The data transmitter/receiver 51 of the management system 50 receives the communication start request information ("communication start request"), which requests to start communication between the terminal 10*aa* and the terminal 10*db*.

Figure 15A:
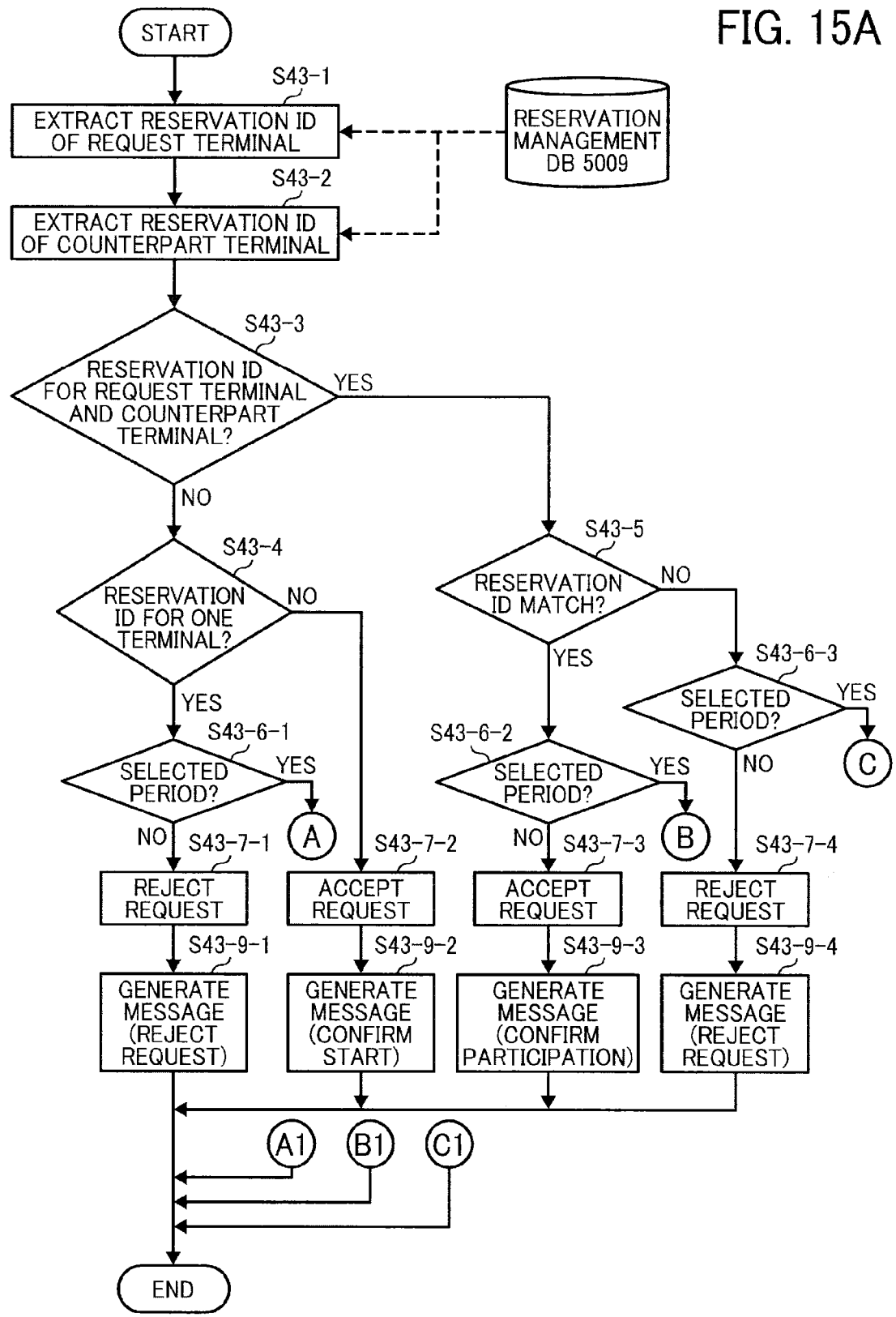
FIG. 15A is a flowchart illustrating operation of determining whether to accept or reject a communication start request, performed by the transmission management system of FIG. 6, according to an example embodiment of the present invention.
Figure 15B:
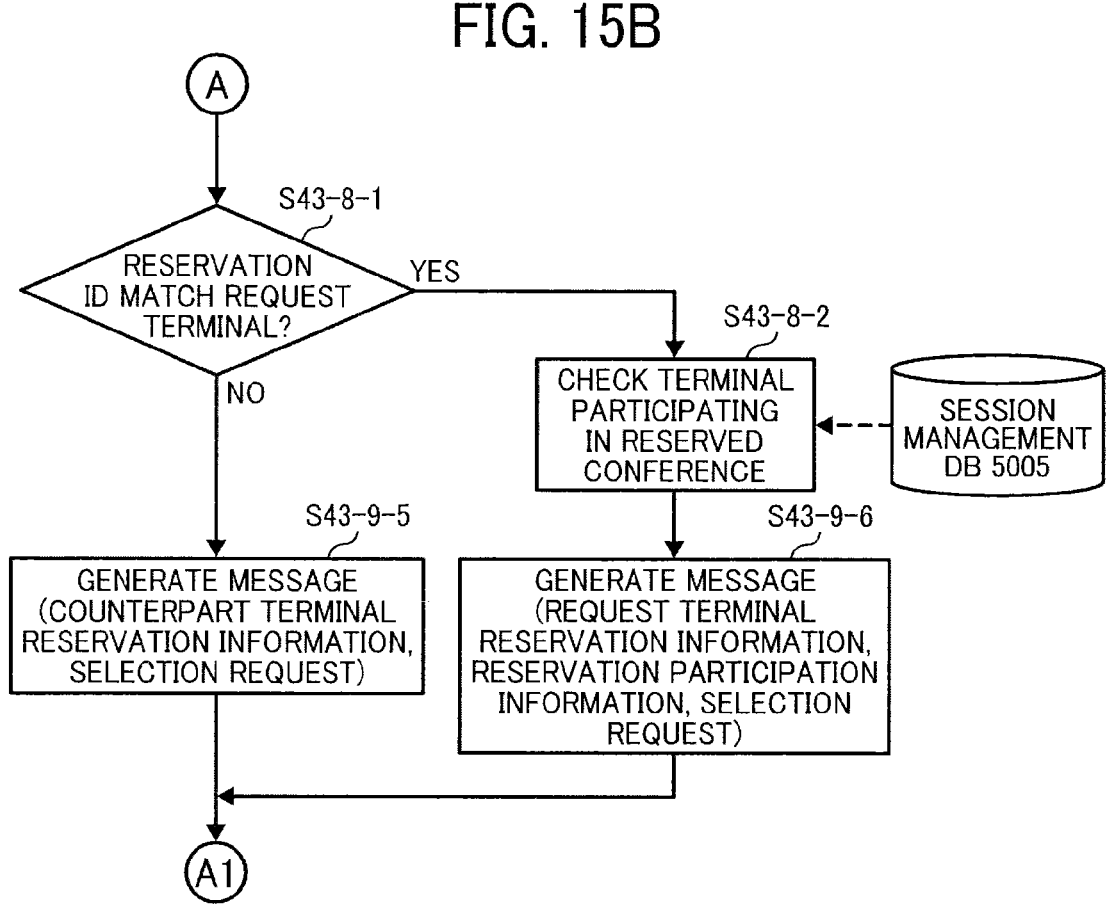
FIG. 15B is a flowchart illustrating operation of generating a message, performed by the management system of FIG. 6, according to an example embodiment of the present invention.
Figure 15C:
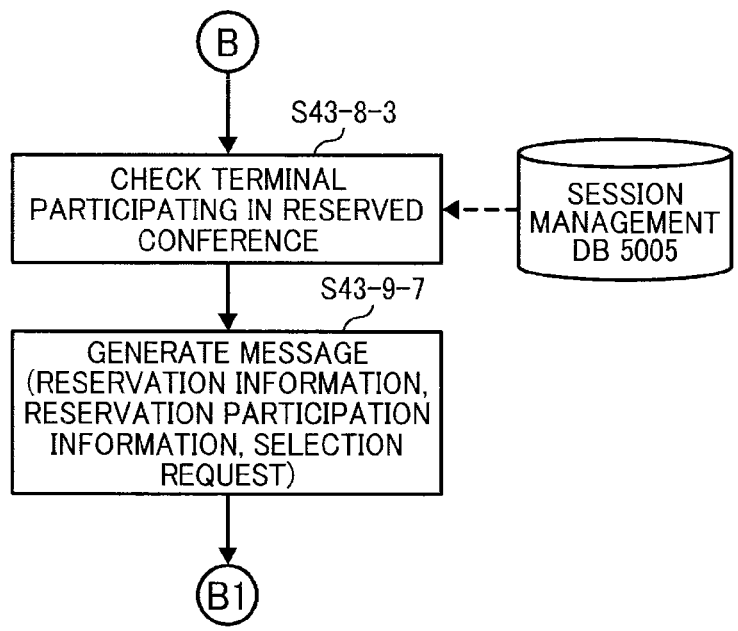
FIG. 15C is a flowchart illustrating operation of generating a message, performed by the management system of FIG. 6, according to an example embodiment of the present invention.
Figure 15D:
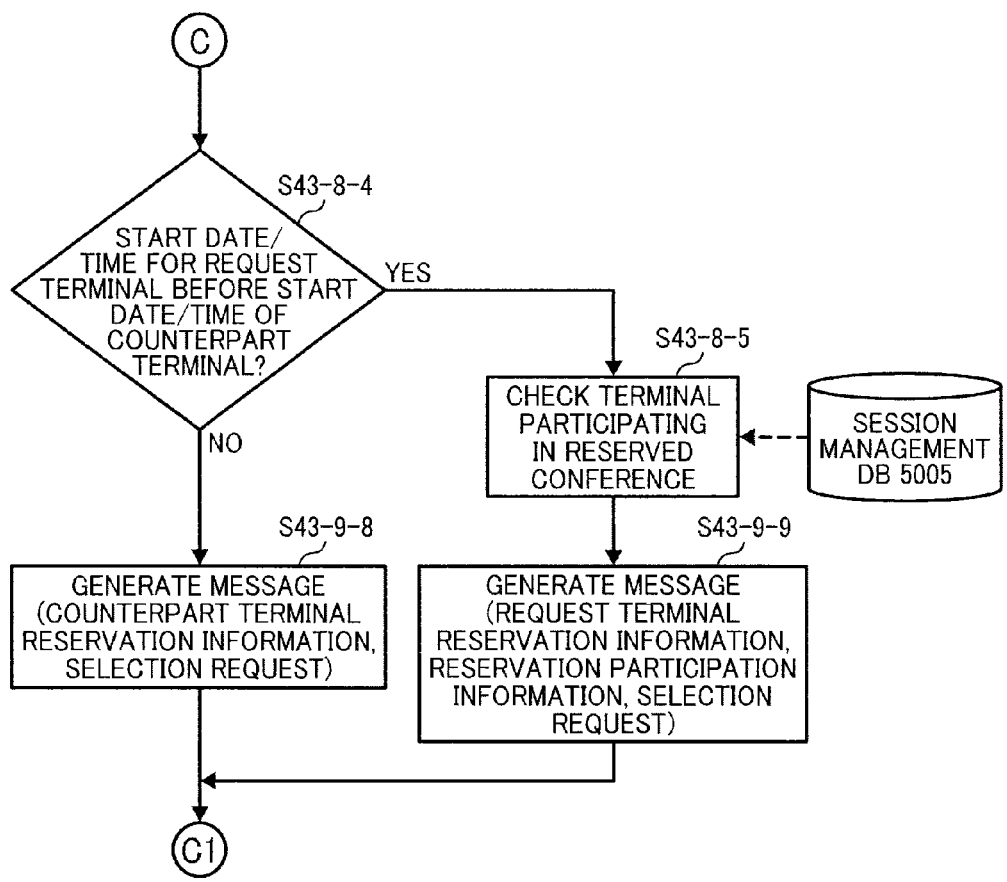
FIG. 15D is a flowchart illustrating operation of generating a message, performed by the management system of FIG. 6, according to an example embodiment of the present invention.
Figure 16B:
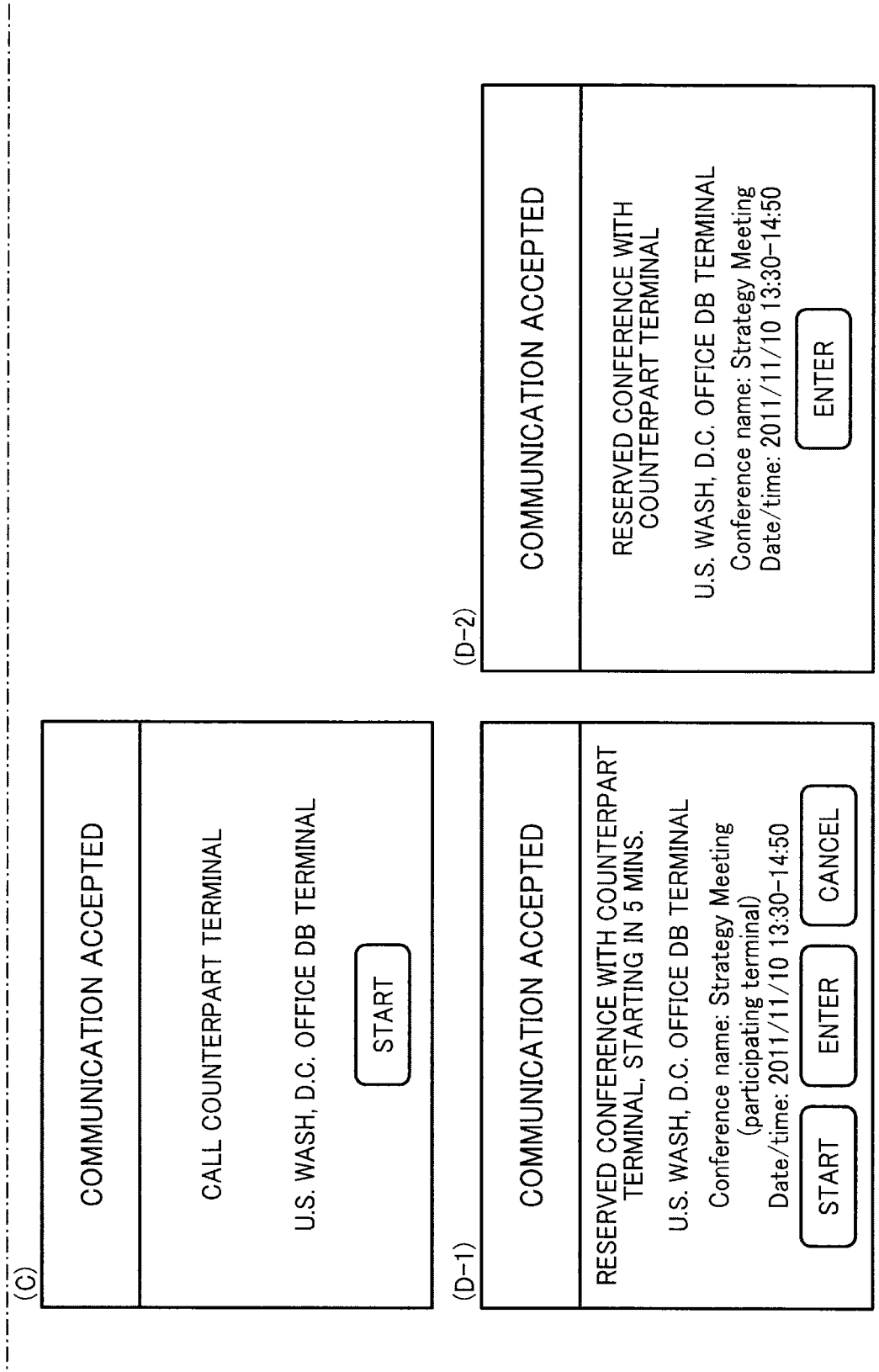

At S43, the management system 50, which receives the communication start request, determines whether to accept the communication start request based on information regarding reservation of communication, as described below referring to FIGS. 15A to 15D and 16A to 16B. FIG. 15A is a flowchart illustrating operation of determining whether to accept a communication start request. FIGS. 15B to 15D each illustrate a flowchart of operation of generating a message. FIGS. 16A and 16B are an illustration of example messages that may be generated by the generator 63, in response to the communication start request.

Referring to FIG. 15A, at S43-1, the reservation extractor 61 searches the reservation management table (FIG. 11) using the terminal ID "01*aa*" of the request terminal 10*aa* as a search key to obtain the reservation ID of a reserved conference of the request terminal 10*aa*, based on the start date/time of the reserved conference. In this example, the reservation extractor 61 obtains information regarding the current date/time based on the output of the clock 215 (FIG. 5), and determines whether there is any reserved conference for the request terminal 10*aa* in the reservation management table (FIG. 11) that is scheduled to start in less than 45 minutes, based on the start date/time of the reserved conference. Based on determination that there is at least one reserved conference that is scheduled to start in less than 45 minutes, the reservation extractor 61 extracts a reservation ID associated with the reserved conference that is scheduled to start in less than 45 minutes. Alternatively, the reservation extractor 61 of the management system 50 may be programmed to start operation of determining whether there is any reserved conference that is scheduled to start soon at any desired time. For example, the reservation extractor 61 may extract the reserved conference, which is scheduled to start in less than 30 minutes or less than 2 hours. In another example, the reservation extractor 61 may extract the reserved conference, which is scheduled to start at any time on the same date.

At S43-2, the reservation extractor 61 searches the reservation management table (FIG. 11) using the terminal ID "01*db*" of the counterpart terminal 10*db* as a search key to extract a reservation ID of the counterpart terminal 10*db*, which is associated with the reserved conference that is scheduled to start in less than 45 minutes, in a substantially similar manner as described above referring to S43-1.

At S43-3, the reservation determiner 62 determines whether the reservation ID is extracted, respectively, for the request terminal 10*aa* and the counterpart terminal 10*db*, based on whether the reservation ID is extracted at S43-1 and S43-2. When it is determined that the reservation ID is not extracted for each one of the request terminal 10*aa* and the counterpart terminal 10*db* ("NO" at S43-3), the operation proceeds to S43-4. At S43-4, the reservation determiner 62 determines whether one of the reservation ID for the request terminal 10*aa* (extracted at S43-1) or the reservation ID for the counterpart terminal 10*db* (extracted at S43-2) is extracted. When it is determined that there is one of the reservation ID for the request terminal 10*aa* or the reservation ID for the counterpart terminal 10*db*, which is extracted ("YES" at S43-4), the operation proceeds to S43-6-1.

At S43-6-1, the reservation determiner 62 determines whether there is at least five minutes left, until the time reaches the start/date time of the reserved conference associated with the extracted reservation ID, based on the output of the clock 215 (FIG. 5). For example, assuming that the extracted reservation ID is "rsv02" such that the start date/time is "13:30" (FIG. 11), and the output of the clock 215 is "13:24", the reservation determiner 62 determines that there is at least five minutes left before the start date/time of the reserved conference. In alternative to determining whether there is at least five minutes left, the reservation determiner 62 may determine based on any desired time having the positive value other than five minutes. For example, determination may be made based on whether there is at least 10 minutes or 30 minutes left.

In this example, through S43-1 to S43-6-1, the reservation determiner 62 determines whether there is any reserved conference that is scheduled to start in a selected time period that ranges between 5 minutes and 45 minutes. More specifically, the reservation determiner 62 is able to select any reserved conference having the start date/time that falls in a selected time period ranging between 5 minutes and 45 minutes. This selected time period may be used to determine whether to start or not start communication in response to the communication start request. For this reasons, at S43-6-1, the reservation determiner 62 determines whether the start date/time of the reserved conference having the extracted reservation ID falls within the selected time period.

When it is determined that the start date/time of the reserved conference having the extracted reservation ID falls within the selected time period ("YES" at S43-6-1), the operation proceeds to S43-8-1 (FIG. 15B). At S43-8-1, the reservation determiner 62 determines whether the extracted reservation ID is associated with the request terminal 10*aa*. When it is determined that the extracted reservation ID of one of the terminals is not associated with the request terminal 10*aa* ("NO" at S43-8-1), the reservation determiner 62 determines that the extracted reservation ID is associated with the counterpart terminal, and the operation proceeds to S43-9-5. At S43-9-5, the generator 63 generates a message (A-1) of FIG. 16A, which includes reservation information regarding the reserved conference of the counterpart terminal 10*db* and a request that requests the user to select whether to start communication with the counterpart terminal 10*db* based on the reserved conference. More specifically, in this example, through selection of the "START" key, the user is able to select to start communication based on reservation. Through selection of the "CANCEL" key, the user is able to select not to start communication based on reservation. The message (A-1) includes the terminal name of the counterpart terminal 10*db*, and a time period until the reserved conference starts. In this example, the reserved conference is identified using the extracted reservation ID.

Referring back to FIG. 15B, when it is determined that the extracted reservation ID is associated with the request terminal 10*aa* ("YES" at S43-8-1), the operation proceeds to S43-8-2. At S43-8-2, the session manager 57 searches the session management table (FIG. 10) using the extracted reservation ID associated with the request terminal 10*aa* as a search key to extract one or more terminal IDs of the participating terminals 10. Based on whether there is one or more terminal IDs being extracted, the reservation determiner 62 determines whether there is one or more participating terminals 10 that are participating in the reserved conference identified with the extracted reservation ID.

At S43-9-6, the generator 63 generates a message (A-2) of FIG. 16A, which includes reservation information regarding the reserved conference associated with the request terminal 10*aa*, and a request that requests the user to select whether to start communication with the counterpart terminal 10*db* based on the reserved conference. The message (A-2) includes various information regarding the reserved conference associated with the request terminal 10*aa*, such as the conference name, the start date/time, the end date/time, the time period until the reserved conference starts, and information indicating whether there is any participating terminal that is participating in the reserved conference ("reservation participation information"). The reservation participation information is generated based on whether there is one or more participating terminals 10 as described above referring to S43-8-2.

Referring back to S43-6-1 of FIG. 15A, when it is determined that the start date/time of the reserved conference does not fall within the selected time period ("NO" at S43-6-1), the reservation determiner 62 determines that the reservation conference will start in less than five minutes, and the operation proceeds to S43-7-1. At S43-7-1, the reservation determiner 62 determines to reject the communication start request.

At S43-9-1, the generator 63 generates a message, which includes reservation information indicating the reserved conference associated with one of the request terminal 10 or the counterpart terminal, and indicates rejection of the communication start request. In one example, assuming that the reserved conference having the extracted reservation ID is associated with the counterpart terminal 10*db*, the generator 63 generates a message (B-1) of FIG. 16A with the terminal name of the counterpart terminal 10*db*. In another example, assuming that the reserved conference having the extracted reservation ID is associated with the request terminal 10*aa*, the generator 63 generates a message (B-2) of FIG. 16A, which includes information regarding the reserved conference of the request terminal 10*aa* such as the conference name, the start date/time, and the end date/time. With this message indicating that the request or counterpart terminal 10 has the reserved conference that is scheduled to start shortly, the user at the request terminal 10 is able to know why the communication start request is rejected.

Referring back to S43-4 of FIG. 15A, when it is determined that there is no reservation ID for the request terminal 10*aa* and the counterpart terminal 10*db* ("NO" at S43-4), the operation proceeds to S43-7-2. At S43-7-2, the reservation determiner 62 determines that there is no reserved conference for the request terminal 10*aa* or the counterpart terminal 10*db*, and determines to accept the communication start request.

At S43-9-2, the generator 63 generates a message confirming that communication will be started with the counterpart terminal 10*db*, for example, in response to the user selection of the "START" key, as illustrated in (C) of FIG. 16B.

Referring back to S43-3 of FIG. 15A, when it is determined that the reservation ID is extracted, respectively, for the request terminal 10*aa* and the counterpart terminal 10*db* ("YES" at S43-3), the operation proceeds to S43-5. At S43-5, the reservation determiner 62 determines whether the reservation ID associated with the request terminal 10*aa* matches the reservation ID associated with the counterpart terminal 10*db*. When it is determined that the reservation ID for the request terminal 10*aa* matches the reservation ID for the counterpart terminal 10*db* ("YES" at S43-5), the operation proceed to S43-6-2. At S43-6-2, the reservation determiner 62 determines whether there is at least five minutes until the reserved conference, at which the request terminal 10*aa* and the counterpart terminal 10*db* are scheduled to participate, starts, in a substantially similar manner as described above referring to S43-6-1.

When it is determined that there is at least five minutes before the reserved conference starts, that is, the start date/time of the reserved conference falls within the selected time period ("YES" at S43-6-2), the operation proceeds to S43-8-3 of FIG. 15C. At S43-8-3, the session manager 57 searches the session management table (FIG. 10) using the reservation ID common to the request terminal 10*aa* and the counterpart terminal 10*db* as a search key to extract one or more terminal IDs of one or more participating terminals that are participating in the reserved conference. Based on whether there is one or more terminal IDs being extracted, the reservation determiner 62 determines whether there is one or more participating terminals 10 that are participating in the reserved conference.

At S43-9-7, the generator 63 generates a message (D-1) of FIG. 16B, which includes reservation information regarding the reserved conference common to the request terminal 10*aa* and the counterpart terminal 10*db*, and a request that requests the user to select whether to start communication with the counterpart terminal 10*db*. The message (D-1) includes the terminal name of the counterpart terminal 10*db*, and information regarding the reserved conference such as the conference name, the start date/time, the end date/time, and a time period until the reserved conference starts, and information indicating whether there is any participating terminal that is participating in the reserved conference ("reservation participation information"). The message (D-1) further includes the "START" key, the "ENTER" key, and the "CANCEL" key, as illustrated in FIG. 16B. The "ENTER" key allows the user to start communication based on the reserved conference. The "START" key allows the user to start communication not based on reservation. Even when the request terminal 10*aa* and the counterpart terminal 10*db* are scheduled to participate in the same conference, in case the start date/time of the reserved conference falls within the selected time period, the user may choose to start communication not based on reservation.

Referring back to S43-6-2, when it is determined that the start date/time of the reserved conference does not fall within the selected time period ("NO" at S43-6-2), the operation proceeds to S43-7-3. At S43-7-3, the reservation determiner 62 determines to accept the communication start request.

At S43-9-3, the generator 63 generates a message (D-2) of FIG. 16B, which includes reservation information regarding the reserved conference common to the request terminal 10*aa* and the counterpart terminal 10*db*, and the "Enter" key that allows the user to start communication based on the reserved conference. The message (D-2) includes the terminal name of the counterpart terminal 10*db*, and information regarding the reserved conference such as the conference name, the start date/time, and the end date/time. In this manner, when the request terminal 10 and the counterpart terminal 10 are both scheduled to participate in the same reserved conference that will start shortly, the user at the request terminal 10 is requested to start communication based on reservation.

Referring back to S43-5 of FIG. 15A, when it is determined that the reservation ID associated with the request terminal 10*aa* does not match the reservation ID associated with the counterpart terminal 10*db* ("NO" at S43-5), the operation proceeds to S43-6-3. At S43-6-3, the reservation determiner 62 determines whether there is at least five minutes until the reserved conference for any one of the request terminal 10*aa* and the counterpart terminal 10*db* starts at the start date/time. That is, the reservation determiner 62 determines whether the start date/time of the reserved conference for any one of the request terminal 10*aa* and the counterpart terminal 10*db* falls within the selected period, in a substantially similar manner as described above referring to S43-6-1.

When it is determined that the start date/time of the reserved conference falls within the selected period ("YES" at S43-6-3), the operation proceeds to 43-8-4 of FIG. 15D. At S43-8-4, the reservation determiner 62 determines whether the start date/time of the reserved conference for the request terminal 10*aa* is earlier than the start date/time of the reserved conference for the counterpart terminal 10*db*. When it is determined that the start date/time of the reserved conference for the request terminal 10*aa* is later than the start date/time of the reserved conference for the counterpart terminal 10*db* ("NO" at S43-8-4), the operation proceeds to S43-9-8. At S43-9-8, the generator 63 generates a message (A-1) of FIG. 16A, which includes reservation information regarding the reserved conference for the counterpart terminal 10*db* and a request that requests the user to select whether to start communication based on the reserved conference. The message (A-1) further includes the terminal name of the counterpart terminal 10*d*, and a time period until the reserved conference associated with the reserved ID extracted for the counterpart terminal 10*db* starts.

When it is determined that the start date/time of the reserved conference for the request terminal 10*aa* is earlier than the start date/time of the reserved conference for the counterpart terminal 10*db* ("YES" at S43-8-4), the operation proceeds to S43-8-5. At 543-8-5, the session manager 57 searches the session management table (FIG. 10) using the reservation ID associated with the request terminal 10*aa* as a search key to extract one or more terminal IDs of the participating terminals 10. Based on whether there is one or more terminal IDs being extracted, the reservation determiner 62 determines whether there is one or more participating terminals 10 that are participating in the reserved conference.

At S43-9-9, the generator 63 generates a message (A-2) of FIG. 16A, which includes the reservation information regarding the reserved conference associated with the request terminal 10*aa*, and a request that requests the user to select whether to start communication based on the reserved conference. The message (A-2) includes various information regarding the reserved conference associated with the request terminal 10*aa*, such as the conference name, the start date/time, the end date/time, and the time period until the reserved conference starts, and information indicating whether there is any participating terminal that is participating in the reserved conference ("reservation participation information").

In this manner, through performing operation of FIG. 15D, the generator 63 is able to generate a message based on reservation information regarding a reserved conference that is scheduled to start earlier.

Referring back to S43-6-3 of FIG. 15A, when it is determined that the start date/time of the reserved conference for any one of the request terminal 10*aa* and the counterpart terminal 10*db* does not fall within the selected time period ("NO" at S43-6-3), the reservation determiner 62 determines that the reservation conference will start in less than five minutes, and the operation proceeds to S43-7-4. At S43-7-4, the reservation determiner 62 determines to reject the communications start request.

At S43-9-4, the generator 63 generates a message, which includes reservation information indicating the reserved conference that will start in less than five minutes, and indicates rejection of the communication start request. In one example, assuming that the reserved conference having the earlier start date/time is associated with the counterpart terminal 10db, the generator 63 generates a message (B-1) of FIG. 16A with the terminal name of the counterpart terminal 10db. In another example, assuming that the reserved conference having the earlier start date/time is associated with the request terminal 10aa, the generator 63 generates a message (B-2) of FIG. 16A, which includes information regarding the reserved conference of the request terminal 10aa such as the conference name, the start date/time, and the end date/time.

Referring back to FIG. 14, at S44, the data transmitter/receiver 51 of the management system 50 sends selection request information to the request terminal 10aa, which includes the terminal ID "01aa" of the request terminal 10aa, the terminal ID "01db" of the counterpart terminal 10db, and the message that is generated at any one of S43-9-1 to S43-9-6. In one example, when the reservation ID associated with the request terminal 10aa matches the reservation ID associated with the counterpart terminal 10db ("YES" at S43-5), the data transmitter/receiver 51 of the management system 50 sends the reservation ID common to the request and counterpart terminals as part of the selection request information.

At S45, the data transmitter/receiver 11 of the request terminal 10aa, which receives the selection request information, accepts a request for selecting whether to start communication. The request terminal 10aa causes the display control 16 to display the message generated based on the selection request information on the display 120aa, for example, as illustrated in FIG. 16A or 16B. In one example, assuming that the user selects the "ENTER" key through the operation key 108, the operation input 12 receives a request to start communication based on the reserved conference. In another example, assuming that the user selects the "START" key through the operation key 108, the operation input 12 receives a request to start communication not based on reservation. In another example, assuming that the user selects the "CANCEL" key or "OK" key, the operation input 12 receives a request for cancelling the communication start request. For the descriptive purposes, in the following, it is assumed that the request for starting communication is received, either based on reservation or not based on reservation.

In response to the request for starting communication, at S46, the data transmitter/receiver 11 of the request terminal 10aa sends response information, such as confirmation information confirming to start communication, to the management system 50. The confirmation information includes the terminal ID "01aa" of the request terminal 10aa and the terminal ID "01db" of the counterpart terminal 10db. In this example, when the confirmation information requests to start communication based on the reserved conference common to the request terminal 10aa and the counterpart terminal 10db, the data transmitter/receiver 11 sends the reservation ID, which is received at S44, to the management system 50.

At S47, the data transmitter/receiver 51 of the management system 50, which receives the response information, accepts the request for starting communication. The state manager 53 of the management system 50 specifies the records associated with the terminal IDs "01aa" and "01db" of the terminals 10aa and 10db, which are respectively obtained from the terminal management table (FIG. 9), and changes the "operation state" field for each one of the records to "MEETING".

At S48, the session manager 57 manages initiation of a contents data session "sed", using the session management table (FIG. 10). More specifically, the session manager 57 adds the terminal IDs "01aa" and "01db" of the terminals 10aa and 10db, which start communication, to the session management table (FIG. 10).

Figure 17:
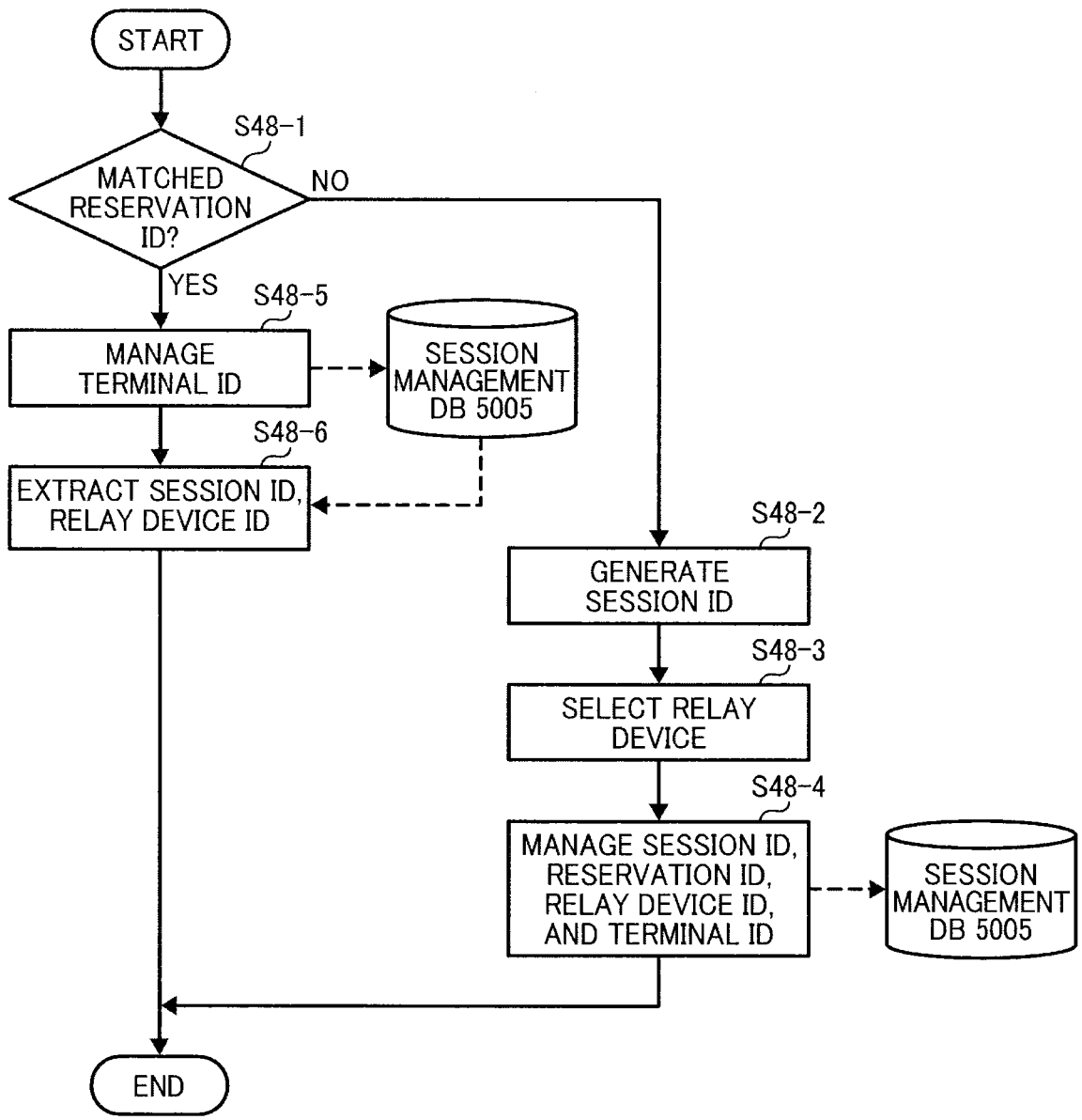
FIG. 17 is a flowchart illustrating operation of managing information regarding a session established between or among a plurality of transmission terminals, according to an example embodiment of the present invention.

Referring now to FIG. 17, operation of managing information regarding a session, performed by the management system 50, is explained according to an example embodiment of the present invention.

At S48-1, the session manager 57 determines whether the session management table (FIG. 10) stores the reservation ID, which matches the reservation ID included in the confirmation information. In this example, when it is determined that the reservation ID is not included in the confirmation information, the session manager 57 determines that the reservation ID that matches the reservation ID of the confirmation information is not stored. When it is determined that the reservation ID that matches the reservation ID of the confirmation information is not stored ("NO" at S48-1), the operation proceeds to S48-2. At S48-2, the session manager 57 generates a session ID for identifying a contents data session "sed" to be established to start communication based on reservation.

At S48-3, the relay device selector 56 selects the relay device 30, which relays contents data to be transmitted or received between the terminals 10aa and 10db through the contents data session "sed". More specifically, the relay device selector 56 arbitrarily selects a relay device ID from the relay device IDs stored in the relay device management table (FIG. 7).

At S48-4, the session manager 57 stores the session ID generated at S48-2, the reservation ID included in the confirmation information, the relay device ID selected at S48-3, and the terminal IDs "10aa" and "10db" of the terminals 10aa and 10db, in the session management table (FIG. 10), in association with one another.

When it is determined that the reservation ID that matches the reservation ID of the confirmation information is stored ("YES" at S48-1), the operation proceeds to S48-5. At S48-5, the session manager 57 specifies a record having the reservation ID of the confirmation information in the session management table (FIG. 10), and adds the terminal IDs "01aa" and "01db" of the terminals 10aa and 10db, in the terminal ID field of the specified record, such that the terminal IDs "01aa" and "01db" are stored in association with the reservation ID of the confirmation information.

At S48-6, the session manager 57 searches the session management table (FIG. 10) using the reservation ID of the confirmation information as a search key to extract the session ID and the relay device ID that are stored for the reservation ID.

Referring back to FIG. 14, at S49-1 and S49-2, the data transmitter/receiver 51 of the management system 50 sends the relay device connection information, which is to be used for connecting the relay device 30, respectively, to the terminals 10aa and 10db. The relay device 30 may be selected at S48-3 or extracted at S48-6. The relay device connection information includes, for example, the IP address of the relay device 30 that may be read from the relay device management table (FIG. 7), authentication information, a port number, etc. The relay device connection information further includes the session ID generated at S48-2 or extracted at S48-6. With the relay device connection information, the terminals 10aa and 10db are able to connect the relay device 30 to transmit or receive the contents data through the relay device 30.

At S50, the data transmitter/receiver 51 of the management system 50 transmits the relay start request information that requests for starting relay for the request terminal 10aa, to the relay device 30 selected at S48-3 or extracted at S48-6. The relay start request information includes the IP addresses of the terminal 10aa and the terminal 10db, and the session ID generated at S48-2 or extracted at S48-6. The memory control 39 of the relay device 30 stores the received session ID, and the IP addresses of the terminals 10aa and 10db in the memory 3000. The relay unit 32 relays contents data transmitted from the request terminal 10aa to the terminal 10db via the data transmitter/receiver 31, using the IP address of the terminal 10db stored in the memory 3000. The relay unit 32 further relays contents data transmitted from the terminal 10db to the terminal 10aa via the data transmitter/receiver 31, using the IP address of the terminal 10aa stored in the memory 3000. More specifically, the contents data session "sed" is established between the terminal 10aa and the terminal 10db to exchange contents data.

Figure 18:
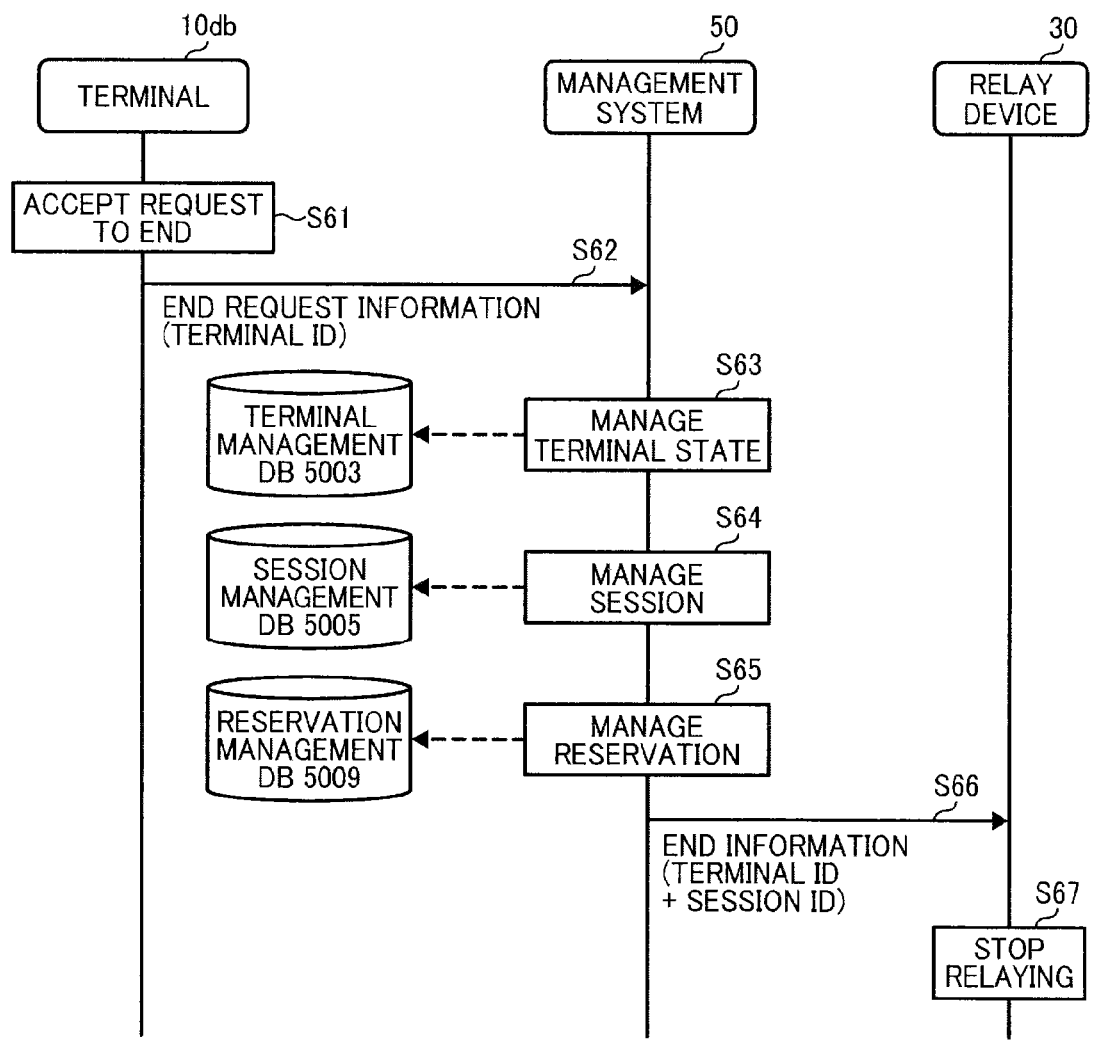
FIG. 18 is a data sequence diagram illustrating operation of processing a request for ending communication with a counterpart terminal, performed by the transmission system of FIG. 1, according to an example embodiment of the present invention.

Referring now to FIG. 18, operation of processing a request for leaving from the contents data session "sed" received from the request terminal 10db, performed by the transmission system 1 of FIG. 1, is explained according to an example embodiment of the present invention. In this example, it is assumed that the request terminal 10db requests to leave from the contents data session "sed" after the contents data session "sed" is established among the terminals 10aa, 10ab, and 10db, to end the conference. In this example illustrated in FIG. 18, various management data is transmitted or received through the management data session "sei".

At S61, as the user at the request terminal 10db presses the operation key 108 (FIG. 4), the operation input 12 (FIG. 6) of the request terminal 10db receives a user instruction for ending communication with the counterpart terminals 10aa and 10ab. At S62, the data transmitter/receiver 11 of the request terminal 10db transmits the end request information to the management system 50. The end request information includes the terminal ID "01db" of the request terminal 10db, and the session ID identifying the contents data session "sed" from which the terminal 10db wants to leave.

At S63, the state manager 53 of the management system 50 specifies a record in the terminal management table (FIG. 9) stored in the terminal management DB 5003, which corresponds to the terminal ID "01db" of the request terminal 10db that is included in the end request information to manage the specified record. More specifically, the state manager 53 changes the operation state of the terminal 10db from "Communicating" to "Online".

At S64, the session manager 57 of the management system 50 refers to the session management table (FIG. 10) stored in the session management DB 5005 to delete the terminal ID "01db" of the request terminal 10db, from the "Terminal ID" data field of the specified record.

In case all of the terminal IDs are deleted from the "Terminal ID" data field of the session management table, the session manager 57 extracts the reservation ID in the record associated with the terminal ID "01db". At S65, the memory control 59 deletes the record having the reservation ID from the reservation management table (FIG. 11). This results in deletion of the reservation information regarding the communication that ends, from the reservation management table.

At S66, the data transmitter/receiver 51 of the management system 50 transmits the end information including the IP address of the request terminal 10db and the session ID to the relay device 30.

At S66, the memory control 39 of the relay device 30 deletes the IP address of the terminal 10db, which is stored in the memory 3000 in association with the received session ID. With this deletion, the relay unit 32 stops relaying contents data, which may be received from the terminal 10db, to the terminals 10ab and 10aa, through the data transmitter/receiver 31. The relay unit 32 further stops relaying contents data, which may be received from the terminal 10ab or 10aa, to the terminal 10db, through the data transmitter/receiver 31.

Through operation of FIG. 18, the terminal 10db leaves from the contents data session "sed" to end communication with the terminals 10aa and 10db.

In the above-described example, the reservation extractor 61 of the management system 50 extracts the start date/time of the reserved conference in response to the communication start request sent from the request terminal 10. The generator 63 generates a message using information regarding the start date/time of the reserved conference that is extracted by the reservation extractor 61. The data transmitter/receiver 51 of the management system 50 transmits the message to the request terminal 10. With this message, the request terminal 10 is able to obtain information based on the start date/time of the reserved conference, without requiring the terminal 10 to refer to such as a table to obtain information regarding the start date/time of the reserved conference.

Further, when there is a reserved conference that is scheduled to start, the data transmitter/receiver 51 of the management system 50 transmits the message that requests the user to select whether to start communication not based on reservation, to the request terminal 10. Through requesting the user at the request terminal 10 to select whether to start communication with information regarding the reserved conference, the user at the request terminal 10 may be discouraged from starting communication not based on reservation especially when the user plans to communicate with a user at the other end for a sufficiently long time period. This prevents the counterpart terminal 10 from not being able to start communication based on reservation.

Further, when the reservation ID associated with the request terminal 10 matches the reservation ID associated with the counterpart terminal 10, the management system 50 transmits a message requesting to select whether to start communication based on the reserved conference having the matched reservation ID, to the request terminal 10. The user at the request terminal 10 may select to start communication based on the reserved conference, or to start communication not based on reservation.

Furthermore, the management system 50 manages the relay device ID for each one of a plurality of relay devices 30 relaying contents data through the contents data session "sed", using the session management table (FIG. 10). The data transmitter/receiver 51 of the management system 50 sends the message to the request terminal 10, together with reservation participation information indicating whether there is any participating terminal 10 that is participating in the reserved conference. Based on the reservation participation information, the user at the request terminal 10 may determine whether to start communication based on the reserved conference.

Further, the session management table (FIG. 10) stores the relay device ID for identifying the relay device 30 to be used for relaying contents data through the contents data session "sed", in association with the terminal ID for identifying each terminal 10 that is participating in the reserved conference through the contents data session "sed". The data transmitter/receiver 51 of the management system 50 transmits the relay device connection information to the terminal 10, which is used to connect the relay device 30 having the relay device ID extracted from the session management table (FIG. 10). This allows the management system 50 to effectively control connections among the terminals 10, even when there are more than two terminals 10 that are communicating based on the reserved conference.

Further, in this example, the data transmitter/receiver 51 of the management system 50 transmits a message to the request terminal 10aa, such as a message requesting the user at the request terminal 10aa to select whether to start communication. Alternatively, the data transmitter/receiver 51 of the management system 50 may transmit a message to the counterpart terminal 10db.

Further, in any one of the above-described examples, any one of the terminals 10 may be identified using any information other than the terminal ID for identifying the terminal 10, as long as each user who operates the terminal 10 can be identified. In one example, the terminal 10 may be identified using a user ID that uniquely identifies the user who operates the terminal 10. In such case, at S22 of FIG. 12, the management system 50 receives the login request information including the user ID and the password, from the terminal 10. The management system 50 manages various information regarding the user, using the user ID. For example, the session management table of FIG. 10 may store, for each session being carried out, the session ID, the reservation ID, the relay device ID, and one or more user IDs each identifying the user who is participating in the session using the terminal 10. The reservation management table of FIG. 11 may store, for each reserved conference that is registered, the start date/time, the end date/time, the conference name, and one or more user IDs each identifying the user who is scheduled to attend in the reserved conference. Through managing various information based on the user ID that uniquely identifies the user, the management system 50 is able to manage information by user even when one user is using more than one terminal 10 or even when one terminal 10 is shared by more than one user.

Furthermore, in any one of the above-described examples, the terminal 10 that requests for registration of a conference, and the terminal 10 that requests to start communication based on the reserved conference may be different.

Further, the relay device 30, the management system 50, the program providing system 90, and the maintenance system 100 may be each implemented by a single computer. Alternatively, any number of parts, functions, or modules of the relay device 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay device control program, and transmission management program, or a storage device such as the HDD 204 that stores any one of the terminal control program, relay device control program, and transmission management program, or the program providing system 90 provided with the HD 204 storing any one of the terminal control program, relay device control program, and transmission management program, may be distributed within the country or to another country as a computer program product.

Further, in the above-described examples, the relay device IP address of the relay device 30 and the terminal IP address of the terminal 10 are respectively managed using the relay device management table of FIG. 7 and the terminal management table of FIG. 9. Alternatively, the relay device 30 and the terminal 10 may each be managed using any other identification information or using any other tables. For example, when the relay device 30 or the terminal 10 needs to be identified on the communications network 2, the relay device 30 or the terminal 10 may be managed using Fully Qualified Domain Name (FQDN). In such case, the transmission system 1 is provided with a domain name system (DNS) server that obtains the IP address that corresponds to the FQDN of the relay device 30 or the terminal 10. In view of this, identification information for identifying the relay device 30 on the communications network 2 may not only include the identification information that identifies the relay device 30 on the communications network 2, but also identification information that identifies a node on the communications network 2 to which the relay device 30 is connected, or identification information that identifies a node on the communications network 2 from which the relay device 30 is connected. Similarly, identification information for identifying the terminal 10 on the communications network 2 may not only include the identification information that identifies the terminal 10 on the communications network 2, but also identification information that identifies a node on the communications network 2 to which the terminal 10 is connected, or identification information that identifies a node on the communications network 2 from which the terminal 10 is connected.

In the above-described examples, the transmission system 1 of FIG. 1 is treated as a videoconference system. Alternatively, the transmission system 1 of FIG. 1 may be implemented as a teleconference system such as the IP teleconference system or the Internet teleconference system. Alternatively, the transmission system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. Alternatively, the transmission system 1 may be implemented as a screen sharing system.

Figure 19:
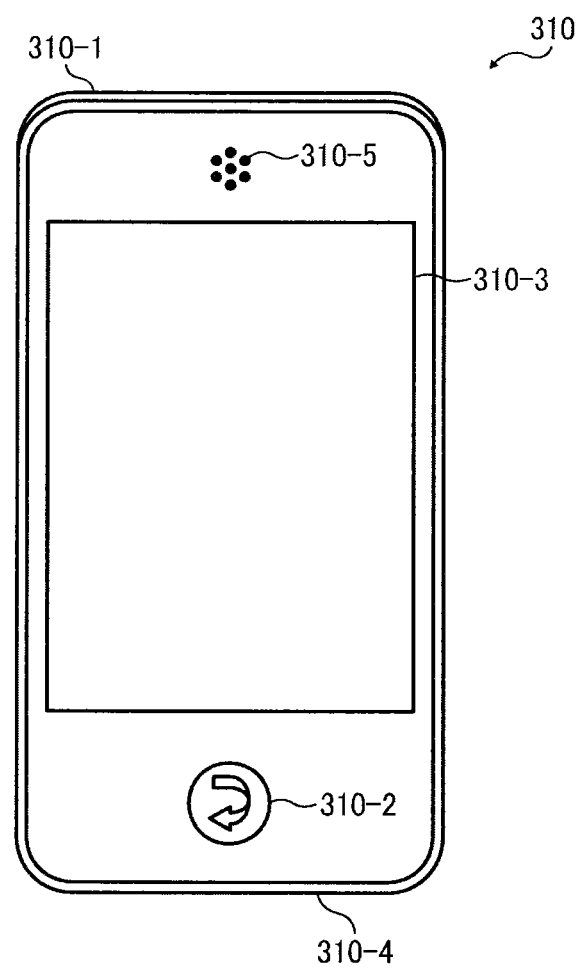
FIG. 19 is an illustration for explaining candidate information, according to an example embodiment of the present invention.

In another example, the transmission system 1 of FIG. 1 may be implemented as a communication system having a portable phone. In such case, the terminal 10 is implemented as the portable phone. For example, as illustrated in FIG. 19, the terminal 10, or the portable phone 310, includes a body 310-1, a menu screen display button 310-2, a display section 310-3, a microphone 310-4 provided at a lower portion of the body, and a speaker 310-5 provided at an upper portion of the body.

Further, in the above-described examples, the transmission system 1 is implemented as a videoconference system for use at offices. Other examples of use of the transmission system 1 include, but not limited to, meetings, casual conversation among family members or friends, and distribution of information in one direction.

Further, any of the above-described devices or units can be implemented as a hardware apparatus, such as a special-purpose circuit or device, or as a hardware/software combination, such as a processor executing a software program.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In one example, the present invention may reside in a transmission management apparatus including: an obtainer that obtains, in response to a communication start request that requests to start communication between a first transmission terminal and a second transmission terminal, first time information indicating the time at which communication reserved for the first transmission terminal is scheduled to start, and second time information indicating the time at which communication reserved for the second transmission terminal is scheduled to start; a generator that generates reservation information regarding communication reserved for at least one of the first transmission terminal and the second transmission terminal, using the first time information and the second time information; and a transmitter that transmits the reservation information to the first transmission terminal.

For example, the transmission management apparatus may be implemented by a transmission management system including one or more processors, such as the transmission management system 50. The obtainer corresponds to the reservation extractor 61. For the descriptive purposes, the extracting may be one example of the obtaining. The generator corresponds to the generator 63. The transmitter corresponds to the data transmitter/receiver 51. The communication start request may be received at a receiver, such as the data transmitter/receiver 51. The transmission management apparatus may additionally include a manager that manages information regarding reservation, such as time information, for each one of a plurality of transmission terminals.

In one example, a transmission management system includes: a start time manager that manages, for each transmission terminal, information regarding the start date/time of communication based on reservation; a receiver that receives a communication start request that requests to start communication between a first transmission terminal and a second transmission terminal; a start time extractor that extracts start date/time of communication based on reservation for the first transmission terminal, and start date/time of communication based on reservation for the second transmission terminal, in response to the communication start request; a generator that generates reservation information indicating communication to be started based on reservation for the first transmission terminal or the second transmission terminal, based on the start date/time extracted by the start time extractor; and a transmitter that transmits the reservation information generated by the generator to the first transmission terminal.

For example, the start time manager corresponds to the reservation management DB 5009 storing the reservation management table (FIG. 11). The receiver corresponds to the data transmitter/receiver 51 of the management system 50, which may be implemented by the network I/F 209 which operates in cooperation with the CPU 201. The start time extractor corresponds to the reservation extractor 61, which may be implemented by the CPU 201 according to the transmission management program. The generator corresponds to the generator 63, which may be implemented by the CPU 201 according to the transmission management program. The transmitter corresponds to the data transmitter/receiver 51 of the management system 50, which may be implemented by the network I/F 209 which operates in cooperation with the CPU 201.

With the above-described system, even when the management system allows a request transmission terminal to start communication with a counterpart transmission terminal, not based on reservation of communication, the request transmission terminal or the counterpart transmission terminal does not have to refer to the reservation information regarding reservation of communication to determine when to end the communication not based on reservation.

More specifically, in response to the communication start request from the request transmission terminal, the management system 50 sends reservation information indicating reservation of communication for the request transmission terminal or the counterpart transmission terminal to at least the request transmission terminal. For this reasons, the request transmission terminal is able to have information regarding the reservation of communication, such as a reserved conference that is scheduled for the request transmission terminal or the counterpart transmission terminal, without the need to refer to reservation information regarding the reserved conference or to check the start date/time of the reserved conference.

In another example, the generator generates selection request information that requests the user to select whether to start communication between the first transmission terminal and the second transmission terminal. The transmitter sends the selection request information generated by the generator to the first transmission terminal. For example, the selection request information may be generated, using the first time information and the second time information.

In another example, in the transmission management apparatus, the obtainer further obtains first reservation identification information for identifying the communication reserved for the first transmission terminal based on the first time information, and second reservation identification information for identifying the communication reserved for the second transmission terminal based on the second time information. The selection request information is generated based on determination of whether any one of the first reservation identification information and the second reservation identification information is obtained.

For example, when none of the first reservation identification information and the second reservation identification information are obtained, the generator generates the selection request information allowing the user to select to start communication not based on reservation.

In the transmission management apparatus, the selection request information may be generated based on determination of whether the time specified by any one of the first time information and the second time information falls within a selected time period. For example, when one of the first reservation identification information or the second reservation identification information is extracted, the determiner may determine whether the time specified by the time information corresponding to the extracted reservation identification information falls within a selected time period. The selected time period may be previously set, such as a time range that may allow the user to select whether to select communication based on reservation, or not based on reservation. When it is determined that the time indicated by the time information falls within the selected time period, the selection request information allows the user to select whether to start communication based on reservation based on the extracted reservation identification information, or to start communication not based on reservation.

In another example, the selection request information may be generated based on determination of whether the first reservation identification information matches the second reservation identification information, when the first and second reservation identification information are both extracted.

For example, the transmission management apparatus further includes: a determiner that determines whether the first reservation identification information matches the second reservation identification information that are respectively extracted by the extractor. When the determiner determines that the first reservation identification information matches the second reservation identification information, the generator generates the selection request information that requests the user to select whether to start the communication reserved for the first transmission terminal and the second transmission terminal.

In one example, the transmission management system further includes a reservation manager that manages reservation identification information for identifying reservation of communication to be performed by a transmission terminal; a reservation extractor that extracts first reservation identification information for identifying reservation of communication to be performed by the first transmission terminal, and second reservation identification information for identifying reservation of communication to be performed by the second transmission terminal; and a reservation determiner that determines whether the first reservation identification information matches the second reservation identification information that are respectively extracted by the reservation extractor. When it is determined that the first reservation identification information matches the second reservation identification information by the reservation determiner, the generator generates selection request information that requests the user to select whether to start communication based on reservation.

In another example, in the transmission management apparatus, the generator further generates reservation participation information indicating whether there is at least one participating terminal that is currently participating in the communication reserved for the first transmission terminal and the second transmission terminal. The transmitter transmits the reservation participation information to the first transmission terminal.

For example, the transmission management system further includes a participating terminal manager that manages participating terminal identification information for identifying a participating terminal participating in communication based on reservation. When the reservation determiner determines that the reservation identification information matches between the first and second transmission terminals, the generator includes reservation participation information indicating whether there are one or more participating terminals for the communication based on reservation, based on the reservation participation information.

For example, the generator generates the reservation participation information, when any one of the first time information and the second time information falls within a selected time period. With this reservation participation information, the user at the first transmission terminal may determine whether to select to start communication based on reservation.

In another example, the transmission management system further includes: relay device manager that manages relay device identification information for identifying a relay device that relays data to be transmitted or received between transmission terminals to perform communication based on reservation; and a connection controller that causes the relay device be connected with the first transmission terminal and the second transmission terminal, the relay device being identified by the relay device identification information managed by the relay device manager.

For example, the relay device manager corresponds to the relay device management DB 5001. The connection controller corresponds to the data transmitter/receiver 51, which controls connection according to the instructions from the CPU 201, for example, through sending information regarding connection with the relay device.

In another example, the present invention may reside in a transmission terminal including: a receiver that receives the selection request information from the transmission management system; a selection instruction receiver that receives a selection instruction indicating whether to start communication from the user in response to the selection request information; and a transmitter that sends response information based on the selection instruction received by the selection instruction receiver to the transmission management system in response to the selection request information.

For example, the receiver may correspond to the data transmitter/receiver 11 of the transmission terminal 10. The selection instruction receiver corresponds to the operation input 12 or the data transmitter/receiver 11. The transmitter corresponds to the data transmitter/receiver 11 of the transmission terminal 10.

In another example, the present invention may reside in a transmission system including any one of the above-described transmission management system and the transmission terminal.

In another example, the present invention may reside in a method including: receiving a communication start request that requests staring of communication between a first transmission terminal and a second transmission terminal; extracting start date/time of communication based on reservation for the first transmission terminal, and start date/time of communication based on reservation for the second transmission terminal, in response to the communication start request; generating reservation information indicating communication to be started based on reservation for the first transmission terminal or the second transmission terminal, based on the start date/time extracted by the extracting; and transmitting the reservation information generate by the generating to the first transmission terminal.

In another example, the present invention may reside in a non-transitory recording medium storing a plurality of instructions which, when executed by a processor, cause the processor to perform any one of the above-described methods.

What is claimed is:

1. A transmission management apparatus, comprising:
an obtainer configured to obtain, in response to a communication start request that requests to start communication between a first transmission terminal and a second transmission terminal, first time information indicating the time at which communication reserved for the first transmission terminal is scheduled to start, and second time information indicating the time at which communication reserved for the second transmission terminal is scheduled to start;
a generator configured to generate reservation information regarding communication reserved for at least one of the first transmission terminal and the second transmission terminal, using the first time information and the second time information; and
a transmitter configured to send the reservation information to the first transmission terminal.

2. The transmission management apparatus of claim 1, wherein
the generator further generates selection request information that requests a user to select whether to start communication between the first transmission terminal and the second transmission terminal, using the first time information and the second time information, and
the transmitter sends the selection request information to the first transmission terminal.

3. The transmission management apparatus of claim 2, wherein
the obtainer is further configured to obtain first reservation identification information for identifying the communication reserved for the first transmission terminal based on the first time information, and second reservation identification information for identifying the communication reserved for the second transmission terminal based on the second time information, and
the selection request information is generated based on determination of whether any one of the first reservation identification information and the second reservation identification information is obtained.

4. The transmission management apparatus of claim 3, wherein
the selection request information is generated based on determination of whether the time specified by any one of the first time information and the second time information falls within a selected time period.

5. The transmission management apparatus of claim 3, further comprising:
a determiner configured to determine whether the first reservation identification information matches the second reservation identification information that are respectively obtained,
wherein, when the determiner determines that the first reservation identification information matches the second reservation identification information, the generator generates the selection request information that requests the user to select whether to start the communication reserved for the first transmission terminal and the second transmission terminal.

6. The transmission management apparatus of claim 5, wherein:
the generator is further configured to generate reservation participation information indicating whether there is at least one participating terminal that is currently participating in the communication reserved for the first transmission terminal and the second transmission terminal, and the transmitter sends the reservation participation information to the first transmission terminal.

7. The transmission management apparatus of claim 6, wherein the generator generates the reservation participation information, when the time specified by any one of the first time information and the second time information falls within a selected time period.

8. The transmission management apparatus of claim 5, wherein
when the determiner determines that the first reservation identification information does not match the second reservation identification information, the generator generates the selection request information that requests the user to select whether to start communication not based on reservation, only when the time specified by any one of the first time information and the second time information falls within a selected time period.

9. The transmission management apparatus of claim 1, further comprising:
a storage device configured to store, for each one of a plurality of transmission terminals, information regarding communication reserved for each transmission terminal.

10. A transmission management system, comprising:
a network interface configured to receive a communication start request that requests to start communication between a first transmission terminal and a second transmission terminal, from the first transmission terminal; and
one or more processors configured to:
obtain first time information indicating the time at which communication reserved for the first transmission terminal is scheduled to start, and second time information indicating the time at which communication reserved for the second transmission terminal is scheduled to start, in response to the communication start request; and
generate reservation information regarding communication reserved for at least one of the first transmission terminal and the second transmission terminal,
using the first time information and the second time information,
wherein the network interface sends the reservation information to the first transmission terminal.

11. The transmission management system of claim 10, wherein
the one or more processors are further configured to generate selection request information that requests a user to select whether to start communication between the first transmission terminal and the second transmission terminal, using the first time information and the second time information, and
the network interface sends the selection request information to the first transmission terminal.

12. The transmission management system of claim 11, wherein the one or more processors are further configured to obtain first reservation identification information for identifying the communication reserved for the first transmission terminal based on the first time information, and second reservation identification information for identifying the communication reserved for the second transmission terminal based on the second time information,
the selection request information is generated based on determination of whether any one of the first reservation identification information and the second reservation identification information is obtained.

13. The transmission management system of claim 12, wherein the selection request information is generated based on determination of whether the time specified by any one of the first time information and the second time information falls within a selected time period.

14. The transmission management system of claim 12, wherein the one or more processors are configured to determine whether the first reservation identification information matches the second reservation identification information that are respectively obtained, and when it is determined that the first reservation identification information matches the second reservation identification information, the one or more processors are configured to generate the selection request information that requests the user to select whether to start the communication reserved for the first transmission terminal and the second transmission terminal.

15. The transmission management system of claim 14, wherein the one or more processors are further configured to generate reservation participation information indicating whether there is at least one participating terminal that is currently participating in the communication reserved for the first transmission terminal and the second transmission terminal, and the network interface sends the reservation participation information to the first transmission terminal.

16. The transmission management system of claim 15, wherein the one or more processors are further configured to generate the reservation participation information, when the time specified by any one of the first time information and the second time information falls within a selected time period.

17. The transmission management system of claim 14, wherein when it is determined that the first reservation identification information does not match the second reservation identification information, the one or more processors are configured to generate the selection request information that requests the user to select whether to start communication not based on reservation only when the time specified by any one of the first time information and the second time information falls within a selected time period.

18. A transmission system, comprising:

the transmission management system of claim 10; and the first transmission terminal configured to communicate with the transmission management system through a network, the first transmission terminal including:

a user interface configured to receive a selection instruction indicating whether to start communication from the user in response to the selection request information; and a network interface configured to send response information based on the selection instruction to the transmission management system.

19. A non-transitory recording medium storing a plurality of instructions which, when executed by a processor, cause the processor to perform a method, the method comprising:

obtaining, in response to a communication start request that requests to start communication between a first transmission terminal and a second transmission terminal, first time information indicating the time at which communication reserved for the first transmission terminal is scheduled to start, and second time information indicating the time at which communication reserved for the second transmission terminal is scheduled to start;

generating reservation information regarding communication reserved for at least one of the first transmission terminal and the second transmission terminal, using the first time information and the second time information; and sending the reservation information to the first transmission terminal.

* * * * *